(12) United States Patent
Jamali et al.

(10) Patent No.: US 12,312,448 B2
(45) Date of Patent: May 27, 2025

(54) POLYIMIDE MICROPARTICLES

(71) Applicant: Xerox Corporation, Norwalk, CT (US)

(72) Inventors: Hojjat Seyed Jamali, Mississauga (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/437,526

(22) Filed: Feb. 9, 2024

(65) Prior Publication Data
US 2024/0174821 A1 May 30, 2024

Related U.S. Application Data

(63) Continuation of application No. 17/317,096, filed on May 11, 2021, now Pat. No. 11,905,381.

(51) Int. Cl.
*C08J 3/14* (2006.01)
*C08G 73/10* (2006.01)

(52) U.S. Cl.
CPC ........... *C08J 3/14* (2013.01); *C08G 73/1032* (2013.01); *C08J 2479/08* (2013.01)

(58) Field of Classification Search
CPC ......... C08L 79/08; C08J 2479/08; C08J 3/12; C08J 3/14; B33Y 70/00; B33Y 70/10; C08G 73/1003; C08G 73/1007; C08G 73/1028; C08G 73/1032
See application file for complete search history.

(56) References Cited

U.S. PATENT DOCUMENTS 4,405,770 A * 9/1983 Schoenberg ......... C08G 73/105
528/229
4,986,946 A * 1/1991 Parish ...................... C08K 3/04
264/105

FOREIGN PATENT DOCUMENTS

CN 106380847 A * 2/2017 ............. B33Y 10/00
JP 63182346 A * 7/1988

OTHER PUBLICATIONS

JP63182346 English Translation, prepared Mar. 2023. (Year: 2023).*
CN106380847 English Machine Translation, prepared Oct. 3, 2024. (Year: 2024).*

* cited by examiner

*Primary Examiner* — Christopher M Rodd
(74) *Attorney, Agent, or Firm* — Vorys, Sater, Seymour and Pease LLP

(57) ABSTRACT

A method for producing polyimide microparticles may comprise: combining a diamine and a dianhydride in a first dry, high boiling point solvent; reacting the diamine and the dianhydride to produce a mixture comprising poly(amic acid) (PAA) and the first dry, high boiling point solvent; emulsifying the mixture in a matrix fluid that is immiscible with the first dry, high boiling point solvent using an emulsion stabilizer to form a precursor emulsion that is an oil-in-oil emulsion; and heating the precursor emulsion during and/or after formation to a temperature sufficient to polymerize the PAA to form the polyimide microparticles.

14 Claims, 17 Drawing Sheets

POLYIMIDE MICROPARTICLES

FIELD OF INVENTION

The present disclosure relates to polyimide microparticles including synthesis thereof and applications thereof.

BACKGROUND

Polyimide is a high performance plastic with high heat-resistance and chemical resistances properties. Accordingly, polyimides are used in diverse applications like high temperature fuel cells, flat panel displays, aerospace applications, insulating coating, high-temperature adhesives, and many more.

Three-dimensional printing, also known as additive manufacturing, is increasingly used to produce objects. It is considered a versatile technology platform due to its freeform, rapid prototyping, customized components design and production of fine detailed complicated "impossible" architectures with low cost. While additive manufacturing has widespread application areas including, but not limited to, medicine, electronics, automotive, construction, military, and aerospace, the versatility and continuous expansion of additive manufacturing applications impose a growing demand for new feedstock with variety of physicochemical properties to address the market exigence.

Selective laser sintering (SLS), one of the most important additive manufacturing techniques, is a powder-based procedure that allows 3D printing of very complex parts via a self-supporting manner that does not need additional auxiliary or sacrificial materials for overhanging layers. In SLS, like other powder-based AM technologies, polymer particles with spherical shape are favored because of better powder flow, looser powder packing and improved layer spreading. The variety of SLS feedstock is much less than that for ordinary processing methods, such as injection molding, since the materials have a number of specific parameters that must be met to be suitable for the SLS process. For polymer particles, three parameters are (a) the degree to which the polymer particle exhibits thermoplastic properties, b) the degree to which the polymer exhibits a semi-crystalline morphology, and (c) an average diameter of about 100 microns or less, preferably about 50 microns or less.

The thermoplasticity of the polymer particles allows the polymer, at least at the surface of the particle, to become pliable or moldable, which allows neighboring particles to fuse together under the laser beam. The extent of the semi-crystalline morphology of the polymer of the particle is the primary contributor to the mechanical properties of the produced object. The diameter of the polymer particles allows for better powder flow and packing when producing the object by SLS.

Polyimides are an interesting class of high performance polymers due to the (a) high chemical, heat, and dimensional resistance, (b) low dielectric constant and thermal expansion coefficient, and (c) excellent mechanical properties. Although these features make PIs exciting candidates for SLS applications, there are severe processing challenges to consider when converting polyimides to SLS feedstock.

Generally, polyimides have a rigid polymer backbone especially in the case of aromatic polyimides (aramids), which are sometimes classified as thermosets. Many efforts have been made to produce melt-processable polyimides, which have been primarily based on the incorporation of flexible, long-chain aliphatic or bulky monomers in the chemical structure of polyimides. However, even these modified polyimides can be difficult to shape into spherical particles with the preferred dimensions for SLS.

SUMMARY OF INVENTION

The present disclosure relates to polyimide microparticles including synthesis thereof and applications thereof.

Described herein are methods that comprise: combining a diamine and a dianhydride in a first dry, high boiling point solvent; reacting the diamine and the dianhydride to produce a mixture comprising poly(amic acid) (PAA) and the first dry, high boiling point solvent; emulsifying the mixture in a matrix fluid that is immiscible with the first dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles.

Described herein are methods that comprise: combining a diamine and a dianhydride in a first dry, high boiling point solvent; reacting the diamine and the dianhydride to produce a mixture comprising PAA and the first dry, high boiling point solvent; extracting the PAA from the mixture; dissolving the PAA in a second dry, high boiling point solvent to produce a PAA solution; emulsifying the PAA solution in a matrix fluid that is immiscible with the second dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles.

Also described herein are methods that comprise: depositing the polyimide microparticles (produced from one or both of the foregoing methods) optionally in combination with thermoplastic polymer particles (preferably of similar size and shape but may be porous or solid) upon a surface (e.g., in layers and/or in a specified shape), and once deposited, heating at least a portion of the polyimide microparticles to promote consolidation thereof and form a consolidated body (or object).

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
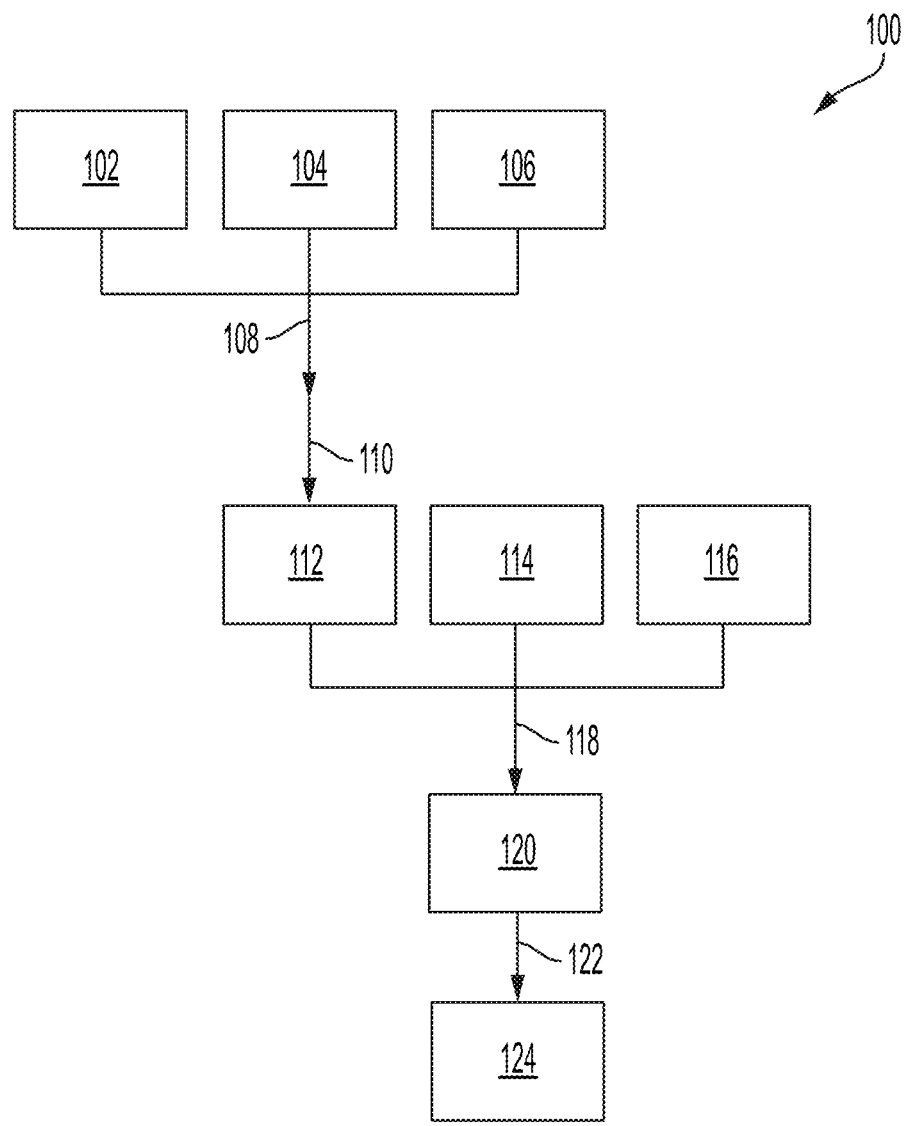
FIG. 1 is an illustrative, nonlimiting example method of the present disclosure for producing polyimide particles.

The present disclosure relates to polyimide microparticles including synthesis thereof and applications thereof. More specifically, the present disclosure includes methods, and compositions resulting from such methods, that include (a) the production of poly(amic acid) (PAA) precursors via polycondensation and (b) oil-in-oil emulsion polymerization of the PAA precursors into polyimide microparticles. Advantageously, controlling the conditions of the oil-in-oil emulsion polymerization may allow for tailoring the average diameter and diameter span of the produced polyimide microparticles. Further, the polyimide microparticles produced by methods described herein may have the thermoplastic and semi-crystalline properties as well as the size desirable for powder material in SLS additive manufacturing methods.

The morphology of the polyimide microparticles described herein is porous, which allows the polyimide microparticles to be useful in applications beyond SLS additive manufacturing. The morphology is such that the polyimide forms an irregular scaffold, similar to those seen in sol-gels and/or aerogels. This is in contrast to more regular scaffolds seen in open cell morphologies, closed cell morphologies, and topologically ordered porous structures. The porous, irregular scaffold morphology may comprise interconnected flake-like and/or ribbon-like structures (e.g., FIG. 7D in the Examples) and/or interconnected solidified-polymer melt structure (e.g., FIG. 9C and FIG. 10B in the examples). The morphology of the polyimide microparticles increases the surface area of said microparticles as compared to solid microparticles of the same dimensions. This coupled with the high temperature stability may make the polyimide microparticles described herein suitable for use as a material in applications like catalyst supports, high-surface area membranes, column packing material for chromatography (e.g., gas chromatography and liquid chromatography), separation materials, chromatographic carriers, adsorbents, low dielectric fillers, supports for drug delivery, phonics crystals, nanoelectronics, biotechnology, biomedical applications (e.g., scaffolds for tissue growth), aviation materials, aerospace materials, pervaporation membranes, optical devices, sensor materials, and other applications that utilize polymer matrices in composite materials and/or hybrid materials.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

When referring to a polymer in terms of the -mer units (e.g., polyimide monomers), it would be understood by one skilled in the art that the -mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the term "embed" relative to particles (e.g., nanoparticles) and a surface of a polymer particle refers to the particle being at least partially extending into the surface of the polymer particle such that polymer is in contact with the nanoparticle to a greater degree than it would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refer to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provide an indication of the breadth of the particle size distribution and are calculated as (D90-D10)/D50.

Particle diameters and particle size distributions are determined by light scattering techniques using a Malvern MASTERSIZER™ 3000. For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the term "circularity" relative to the particles refers to how close the particle is to a perfect sphere. To determine circularity, optical microscopy images using flow particle imaging are taken of the particles. The perimeter (P) and area (A) of the particle in the plane of the microscopy image are calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil), the kinematic viscosity data cited herein was provided by the manufacturer, whether measured according to the foregoing ASTM or another standard measurement technique.

The crystallization temperature (° C.), unless otherwise specified, is determined by ASTM D3417. The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning calorimetry (DSC). DSC provides a rapid method for determining polymer crystallinity based on the heat required to melt the polymer.

The crystallinity (%) of a polymer, unless otherwise specified, is determined by ASTM D3417, by quantifying the heat associated with melting (fusion) of the polymer using a reference for 100% crystallinity of a polyimide R-BAPB based on 1,3-bis(3,3'-4,4'-dicarboxyphenoxy)benzene (dianhydride R) and 4,4'-bis(4 aminophenoxy) biphenyl (diamine BAPB) where ΔH=98 J/g.

Polyimide Microparticle Syntheses and Compositions

Generally, the method described herein for producing polyimide microparticles includes first synthesizing a poly (amic acid) (PAA) and then thermally polymerizing the PAA while the PAA is part of the internal phase of an oil-in-oil emulsion to yield polyimide microparticles.

FIG. 1 is a flow chart illustrating a nonlimiting example method 100 for the production of polyimide microparticles described herein. In this example, a diamine 102 and a dianhydride 104 are combined 108 in a high boiling point solvent 106 and exposed 110 to polycondensation reaction conditions, which cause the diamine 102 and the dianhydride 104 to react to form a PAA. Generally, polycondensation reactions between a diamine and a dianhydride occur at ambient temperatures and pressures. Therefore, as the diamine 102 and the dianhydride 104 are combined 108, the polycondensation reaction may be occurring. To mitigate the reaction occurring during combining 108, the temperature may be reduced during combining (e.g., less than about)– 20° C. Therefore, methods may include combining 108 the diamine 102 and the dianhydride 104 and then exposing 110 the diamine 102 and the dianhydride 104 to polycondensation reaction conditions. Alternatively, methods may include combining 108 the diamine 102 and the dianhydride 104 while exposing 110 the diamine 102 and the dianhydride 104 to polycondensation reaction conditions. Stated differently, exposing 110 the diamine 102 and the dianhydride 104 to polycondensation reaction conditions may occur during and/or after combining 108 the diamine 102 and the dianhydride 104.

Examples of diamines include, but are not limited to, p-phenylenediamine; ethylenediamine; propylenediamine; trimethylenediamine; diethylenetriamine; triethylenetetramine; hexamethylenediamine; heptamethylenediamine; octamethylenediamine; nonamethylenediamine; decamethylenediamine; 1,12-dodecanediamine; 1,18-octadecanediamine; 3-methylheptamethylenediamine; 4,4-dimethylheptamethylenediamine; 4-methylnonamethylenediamine; 5-methylnonamethylenediamine; 2,5-dimethylhexamethylenediamine; dimethylpropylenediamine; N-methyl-bis(3-aminopropyl)amine; 3-methoxyhexamethylenediamine; 1,2-bis(3-aminopropoxy)ethane; bis(3-aminopropyl) sulfide; 2,5-dimethylheptamethylenediamine; 2,2 trans-1,4-cyclohexanediamine; bis-(4-aminocyclohexyl)methane; m-phenylenediamine; p-phenylenediamine; 2,4-diaminotoluene; 2,6-diaminotoluene; m-xylylenediamine; p-xylylenediamine; 2-methyl-4,6-diethyl-1,3-phenylenediamine; 5-methyl-4,6-diethyl-1,3-phenylenediamine; benzidine; 3,3"-dimethylbenzidine; 3,3"dimethoxybenzidine; 1,5-diaminonaphthalene; bis(4-aminophenyl)methane; bis(2-chloro-4-amino-3,5-diethylphenyl) methane; bis(4-aminophenyl)propane; 2,4-bis(b-amino-t-butyl)toluene; bis(p-b-amino-t-butylphenyl) ether; bis(p-b-methyl-o-aminophenyl) benzene; bis(p-b-methyl-o-aminopentyl) benzene; 1,3-diamino-4-isopropylbenzene; bis(4-aminophenyl) sulfide; bis(4-aminophenyl) sulfone; bis(4-aminophenyl) ether; 1,3-bis(3-aminopropyl) tetramethyldisiloxane; 2,3,5,6-teramethyl-1,4-phenylenediamine; 2,6-diaminotriptycene; 4,4'-oxydianiline; 3,4'-oxydianiline; 4,4'-diaminodiphenyl sulfone; 2,5-dimethyl-1,4-phenylenediamine; 4,4'-methylenedianiline; 5-amino-2-(4-aminobenzene)benzimidazole; 2,2'-dimethylbenzidine; 4,4'-diaminobenzanilide; 2,2'-bis(trifluoromethyl)benzidine; 2,2-bis(3-amino-4-hydroxyphenyl)hexafluoropropane; 1R,2R-diaminocyclohexane; 1,3-diaminoadamantane; bis(aminomethyl)bicyclo[2.2.1]heptane; 5-tert-butyldimethylsilylamino-N-tert-butyldimethylsilyl-1, 3,3-trimethylcyclohexanemethylamine; 2,5-diamino-2,5-dideoxy-1, 4:3,6-dianhydroiditol; 2,5-diamino-2,5-dideoxy-1,4:3,6-dianhydrosorbitol; N,N-bis(3-aminopropyl)-methylamine; ethylenediamine; 1,3-diaminopropane; 1,4-diaminobutane; 1,6-diaminohexane; poly(propylene glycol) bis(2-aminopropyl ether); 2,2'-dimethyl-4,4'-diaminodicyclohexylmethane; 2,2'-bis(trifluoromethyl)-4, 4'-diaminobicyclohexylmethane; 4,4'-methylenebis (cyclohexylamine); 4,4'-hexafluoroisopropylidenebis (cyclohexylamine); 4,4'-methylenebis(2-methylcyclohexylamine); bis(4-amino-3-ethylcyclohexyl) methane; 3,3'-diamino-1, l'-di adamantane; trans-11,12-diamino-9,10-dihydro-9,10-ethanoanthracene; 4,4'-diaminodiphenyl ethane; 4,4'-(cyclohexane-1,4-diylbis (sulfanediyl))dianiline; 1,4-bis[2-amino-4-(trifluoromethyl)

phenyl]piperazine; 4,4'-diamino-α-truxillate dimethyl,4',4"-[(perfluorocyclobutane-1,2-diyl)bis(oxy)]bis((1,1'-biphenyl)-4-amine); 5,5'-isopropylidenebis(2-furfurylamine), 1,1-bis(4-aminophenyl)cyclohexane; 1,1-bis(4-aminophenyl)-4-methylcyclohexane; 1,1-bis(4-aminophenyl)-3,3,5-trimethylcyclohexane; 2,2-bis(4-aminophenyl)norbornane; 1,1-bis[4-(2-trifluoromethyl-4-aminophenoxy)phenyl]-4-tert-butylcyclohexane; 3,3-bis(4-aminophenyl)quinuclidine; (+)-cis-1,3-bis(4-amino-2(trifluoromethyl)phenoxymethylene)-1,2,2-trimethylcyclopentane; 1,3-bis(4-aminophenoxymethylene)-1,2,2-trimethylclopentane; 1,4:3,6-dianhydro-2,5-di-O-(4-aminophenyl)-D-mannitol; 1,4:3,6-dianhydro-2,5-di-O-(4-aminophenyl)-D-sorbitol; 2,5-bis(2-trifluoromethyl-4-aminophenoxy)-1,4:3,6-dianhydrosorbitol; 2,5-bis(2-methyl-4-aminophenoxy)-1,4:3,6-dianhydrosorbitol; 1,6-bis(4-aminophenyl)adamantane; 4,9-bis(4-aminophenyl)adamantane; (5R,11R)-6H,12H-5,11-methanodibenzo[b,f][1,5]diazocine-2,8-diamine; (5S,11S)-6H,12H-5,11-methanodibenzo[b,f][1,5]diazocine-2,8-diamine; 4,10-dimethyl-6H,12H-5,11-methanodibenzo[b,f][1,5]diazocine-2,8-diamine; 4,10-dimethyl-6H,12H-5,11-methanodibenzo[b,f][1,5]diazocine-3,9-diamine; 2,8-dibromo-1,4,7,10-tetramethyl-3,9-diamino-6,12-dihydro-5,11-methanodibenzo[b,f][1,5]diazocine; 2,4,8,10-tetramethyl-1,7-diamino-6,12-dihydro-5,11-methanodibenzo[b,f][1,5]diazocine; 2,8-diamino-1,3,7,9-tetramethyl-6H,12H-5,11-methanodibenzo-[b,f][1,5]diazocine; 1,7-diamino-6H,12H-5,11-methanodibenzo[1,5]diazocine-2,8-diol; 3,3,3',3'-tetramethyl-1,1'-spirobisindane-5,5'-diamino-6,6'-diol, 5(6),5'(6')-diamino-3,3,3',3'-tetramethyl-1,1'-spirobisindane; 6,6'-bis-[2"-trifluoromethyl4"-(4"'-aminophenyl)phenoxy]-3,3,3',3'-tetramethyl-1,1'-spirobiindane; 4,4'-((3,3,3',3'-tetramethyl-2,2',3,3'-tetrahydro-1,1'-spirobi[indene]-6,6'-diyl)bis(oxy))bis(2-methoxyaniline); 3,3,3',3'-tetramethyl-2,2',3,3'-tetrahydro-1,1'-spirobi[cyclopenta[b]phenazine]-7,7'-diamine; 1-(4-aminophenyl)-5(6)-aminoindane; 4'-[4-[6-[[4'-amino-3-(trifluoromethyl)[1,1'-biphenyl]-4-yl]oxy]-2,3-dihydro-1,3,3-trimethyl-1H-inden-1-yl]phenoxy]-3'-(trifluoromethyl)-[1,1'-biphenyl]-4-amine; 2,6(7)-diamino-9,10-dimethyl-9,10-dihydro-9,10-ethanoanthracene; 2,8-dimethyl-3,9-diamino-5,6,11,12-tetrahydro-5,11-methanodibenzo[a,e][8]annulene; spiro-(adamantane-2,9'(2',7'-diamino)-fluorene), 2,2-bis(3-amino-4-hydroxyphenyl)adamantane; 2,2-bis(4-aminophenyl)adamantine; 1,3-bis[4-(4-aminophenoxy)phenyl]adamantine; trans-di(aminobenzo)-18-crown-6,2,2'-dimethyl-4,4'-diamino-biphenyl, 4,9-dioxa-1,12-dodecanediamine; 4,7,10-trioxa-1,13-tridecanediamine; and the like; and any combination thereof.

Examples of dianhydrides include, but are not limited to, linear dianhydrides, aromatic dianhydrides, and a combination of linear and aromatic dianhydrides. Examples of dianhydrides include, but are not limited to, pyromellitic dianhydride, 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2bis(4-(2,3-dicarboxyphenoxy)phenyl)propane dianhydride; 4,4'-bis(2,3-dicarboxyphenoxy) diphenyl ether dianhydride; 4,4'-bis(2,3-dicarboxyphenoxy) diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy) diphenyl sulfide dianhydride; 4-(2,3-dicarboxyphenoxy)-4'-(3,4-dicarboxyphenoxy)benzophenone dianhydride; 4-(2,3-dicarboxyphenoxy)-4'-(3,4-dicarboxyphenoxy)diphenyl sulfone dianhydride; 1,2,4,5-benzenetatracarboxylic dianhydride; 1S,2R,4S,5R-cyclohexanetetracarboxylic dianhydride; 1S,2S,4R,5R-cyclohexanetetracarboxylic dianhydride; 1R,2S,4S,5R-cyclohexanetetracarboxylic bicyclo[2.2.2]octane-2-endo,3-endo,5-exo,6-exo-tetracarboxylic 2,3:5,6-dianhydride; dianhydride; bicyclo[2.2.2]octane-2-exo,3-exo,5-exo,6-exo-2,3:5,6-dianhydride, cis-1,2,3,4-cyclohexanetetracarboxylic dianhydride; trans-1,2,3,4-cyclohexanetetracarboxylicdianhydride; bicyclo[2.2.1]heptane-2-endo,3-endo,5-exo,6-exo-tetracarboxylic 2:3,5:6-dianhydride; bicyclo[2.2.1]heptane-2-exo,3-exo,5-exo,6-exo-tetracarboxylic 2:3,5:6-dianhydride; (4arH,8acH)-decahydro-1t,4t:5c,8c-dimethanonaphthalene-2c,3c,6c,7c-tetracarboxylic2,3:6,7-dianhydride; (4arH,8acH)-decahydro-1t,4t:5c,8c-dimethano-naphthalene-2t,3t,6c,7c-tetracarboxylic2,3:6,7-dianhydride; rel[1S,5R,6R]-3-oxabicyclo[3.2.1]octane-2,4-dione-6-spiro-3'-(tetrahydrofuran-2',5'-dione), bicyclo[2.2.1]heptane-2-exo,3-exo,5-exo-tricarboxyl-5-endo-acetic dianhydride; bicyclo[2.2.1]heptane-2-exo,3-exo,5-endo-tricarboxyl-5-exo-acetic dianhydride; 1,2,3,4-cyclobutanctetracarboxylic dianhydride; butane-1,2,3,4-tetracarboxylic dianhydride; bicyclo[2.2.2]oct-7-ene-2-exo,3-exo,5-exo,6-exo-2,3:5,6-dianhydride; 1,8-dimethylbicyclo[2.2.2]oct-7-ene-2,3,5,6-tetracarboxylic dianhydride; bicyclo[4.2.0]octane-3,4,7,8-tetracarboxylic dianhydride; bicyclo[4.2.0]octane-3,4,7,8-tetracarboxylic dianhydride; rel-(1R,1'S,3R,3'S,4S,4'R)-dicyclohexyl-3,3',4,4'-tetracarboxylic dianhydride; rel-(1R,1'S,3R,3'S,4R,4'S)-dicyclohexyl-3,3',4,4'-tetracarboxylic dianhydride; dicyclohexyl-1R, 1'S,2S,2'R',3R,3S'-tetracarboxylic dianhydride; dicyclohexyl-2,3',3,4'-tetracarboxylic dianhydride; 5,5'-oxybis(hexahydro-1,3-isobenzofurandione); 5,5'-(1-methylethylidene)bis[hexahydro-1,3-isobenzofurandione]; 5,5'-methylenebis(hexahydro-1,3-isobenzofurandione); 5,5'-carbonylbis(hexahydroisobenzofuran-1,3-dione); 1,2,3,4-cyclopentanetetracarboxylic dianhydride; 1,2-bis(4'-oxa-3',5-dioxotricyclo-[4.3.0.12.5]decane-8'-yloxy)ethane; 1,3-dimethyl-1,2,3,4-cyclobutanetetracarboxylic dianhydride; 1,2,3,4-tetramethyl-1,2,3,4-cyclobutanetetracarboxylic dianhydride, norbornane-2-spiro-a-cyclohexanone-α'-spiro-2"-norbornane-5,5",6,6"-tetracarboxylic dianhydride; cyclopentanone bis-spiro-norbornane tetracarboxylic dianhydride; 1,2,4-cyclopentanetricarboxylic acid-3-(carboxymethyl)-1,4:2,3-dianhydride; 3,3'-(1,4-piperazinediyl)bis[dihydro-2,5-furandione]; bicyclo[2.2.1]-heptane-2-methanecarboxylic-3,5,6-tricarboxylic-2,3:5,6-dianhydride, 2R,5R,7S,10S-naphthanetetracarboxylic dianhydride; pentacyclo[8.2.1.1$^{4,7}$0$^{2,9}$0$^{3,8}$]tetradecane-5,6,11,12-tetracarboxylic dianhydride; tricyclo[4.2.2.02,5]dec-7-ene-3,4,9,10-tetracarboxylic acid 3,4:9,10-dianhydride; dodecahydro-1H-4,11:5,9-dimethanofluoreno[2,3-c:6,7-c']difuran-1,3,6,8(3aH)-tetraone; tetradecahydro-4, 10:5,9-dimethanonaphtho[2",3":3,4;6",7":3',4']dicyclobuta[1,2-c:1',2'-c']difuran-1,3,6,8-tetrone, 1,2,3,4-butanetetracarboxylic dianhydride; 5,5'-thiobis[hexahydro-4,7-methanoisobenzofuran-1,3-dione]; 1,1,2,2-ethanetetracarboxylic dianhydride; 5,5'-sulfonylbis(hexahydro-4,7-ethanoisobenzofuran-1,3-dione); 5R,5'R-5,5'-exo-(1,1,3,3,5,5-hexamethyltrisiloxane-1,5-diyl)bisbicyclo[2.2.1]heptane-endo-2,3-dicarboxylic anhydride; 5S,5'S-5,5'-exo-(1,1,3,3,5,5-hexamethyltri-siloxane-1,5-diyl)

bisbicyclo[2.2.1]heptane-endo-2,3-dicarboxylic anhydride; and the like; and any combination thereof.

The stoichiometric ratio of the diamine 102 to the dianhydride 104 added during the combining step may be about 2:1 to about 1:2 (or about 1.5:1 to about 1:1.5, or about 1.2:1 to about 1:1.2).

Polycondensation reaction conditions may include temperatures of about 40° C. or less (or about −20° C. to about 40° C., or about −20° C. to about 30° C., or about −10° C. to about 25° C.) and pressures of ambient pressure±about 0.1 MPa. Preferably, the polycondensation reaction goes to completion, which may take from about 4 hours to about 48 hours or longer (or about 4 hours to about 24 hours, or about 12 hours to about 48 hours, or longer).

Regarding the high boiling point solvent 106, without being limited by theory, it is believed that water may decompose the diamine 102. Therefore, the high boiling point solvent 106 preferably has about 0.1 wt % or less (or 0 wt % to about 0.1 wt %, or 0 wt % to about 0.01 wt %, or 0 wt % to about 0.001 wt %) of water. To mitigate water exposure during combining 108 and exposing 110 to polycondensation reaction conditions, the combining 108 and exposing 110 may preferably be performed under a dry atmosphere (e.g., dry nitrogen, dry argon, and the like). One skilled in the art will recognize that there are a plurality of apparatus setups and methods for performing said steps in such a way to mitigate exposure to water.

The high boiling point solvent 106 has a boiling point higher than the temperature at which the polymerization of the precursor emulsion (i.e., the temperature used in the method to polymerize the PAA to form polyimide) is performed. In embodiments, the high boiling point solvent 106 has a boiling point higher than the temperature at which the polymerization is performed of the precursor emulsion by at least about 5° C., or from about 5° C. to about 100° C., or about 10° C. to about 70° C. A high boiling point solvent 106 may have a boiling point at the pressure in which the polymerization of the PAA is performed of about 110° C. to about 200° C. (or about 110° C. to about 160° C., or about 125° C. to about 175° C., or about 140° C. to about) 200° C. That is, generally, the methods herein are preferably performed at or near ambient pressure (e.g., ambient pressure ±about 0.1 MPa). Therefore, the solvents having an IUPAC standard boiling point of about 110° C. to about 200° C. are preferred. However, one skilled in the art will recognize that the boiling point of a fluid is dependent on pressure and that increasing the pressure increases the boiling point of the solvent. Accordingly, if all of or a portion of the methods are performed at a pressure above ambient pressure, the boiling point of the high boiling point solvent at said raised pressure is preferably about 110° C. to about 200° C., which may expand the list of potential solvents for use in the methods described herein.

Examples of high boiling point solvents 106 may include, but are not limited to, N-methyl-2-pyrrolidone (NMP); N,N-dimethylformamide (DMF); N,N-dimethylacetamide (DMAc); N,N-diethylformamide; N,N-diethylacetamide; N-methylpyrrolidone, dimethylsulfoxide (DMSO); sulfolane; and the like; and any combination thereof.

In combining 108, the components may be added in any order. For example, all three components may be combined 108 together simultaneously. In another example, the combining 108 may be performed by dissolving the diamine 102 in the high boiling point solvent 106 and adding the dianhydride 104. The addition of the dianhydride 104 may be as a bolus (i.e., a single addition), stepwise (e.g., two to ten or more additions over a specified amount of time), continuously (e.g., dropwise over a specified amount of time), or a variation thereof. Without being limited by theory, it is believed that dissolving the diamine first and then adding the dianhydride mitigate protonation of the diamine, which can cause the diamine to gel and have disruptive effects on the polycondensation reaction.

The diamine 102 and the dianhydride 104 react via a polycondensation reaction to form a PAA. Therefore, referring back to FIG. 1, exposing 110 the diamine 102 and the dianhydride 104 to polycondensation reaction conditions yields a mixture 112 comprising PAA and the high boiling point solvent 106. The mixture 112 may comprise about 10 wt % to about 50 wt % (or about 10 wt % to about 25 wt %, or about 15 wt % to about 30 wt %, or about 25 wt % to about 50 wt %) of the PAA, about 45 wt % to about 90 wt % (or about 45 wt % to about 65 wt %, or about 55 wt % to about 85 wt %, or about 65 wt % to about 90 wt %) of the high boiling point solvent 106, and 0 wt % to about 5 wt % (or 0 wt % to about 2 wt %, or 1 wt % to about 3 wt %, or 2 wt % to about 5 wt %) of the unreacted reactants (cumulatively the diamine 102 and the dianhydride 104).

Then, the PAA may be extracted from the mixture 112 (see FIG. 2) or the mixture may be used in the following set (as illustrated in this example).

As illustrated in FIG. 1, the mixture 112 is emulsified 118 with an emulsion stabilizer 114 and a matrix fluid 116 that is immiscible with the high boiling point solvent 106 to produce a precursor emulsion 120. Without being limited by theory, it is believed that the resultant precursor emulsion 120 is an oil-in-oil emulsion having an external phase (or continuous phase) comprising the matrix fluid 116 and an internal phase (or discontinuous phase) comprising the PAA dispersed in the high boiling point solvent 106 where the emulsion stabilizer 114 predominantly resides at an interface between the external phase and the internal phase. Small amounts of water may be present in either phase of the oil-in-oil emulsion (e.g., 1 wt % or less or 0.1 wt % or less, for each phase independently).

The emulsion stabilizer 114 may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m²/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be used as an emulsion stabilizer (e.g., emulsion stabilizer 114) in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points and may similarly comprise suitable polymer nanoparticle emulsion stabilizers. Example of polymers suitable for use in polymer nanoparticles may include, but are not limited to, polystyrene-co-acrylates, fluorocarbons, silicone-based polymers, and the like, and any combination thereof.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), fluorocarbon surfactants (e.g., bis(trifluoromethylsulfonyl)amine lithium salt), organic siloxane surfactants, polyoxyalkylene lauryl ethers, polyoxyethylene lauryl ether, polyoxyethylene oleyl ether, and polyoxyethylene cetyl ether surfactants, acrylic polymer surfactants and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), MEGAFAC® surfactants (fluorocarbon surfactants, available from Dainippon Ink), FLUORAD® surfactants (fluorocarbon surfactants, available from 3M), KP341 surfactant (organic siloxane surfactant, available from Shinetsu Chemical Industries), DBE (polyalkylene oxide modified silicone products, manufactured by Chisso Corporation), POLYFLOW (alkylsiloxane, manufactured by Kyocisha Chemical Co., Ltd.), GLANOL (silicone compound, manufactured by Kyocisha Chemical Co., Ltd.), BYK (silicone compound, manufactured by BYK Japan KK), EMULMIN (polyoxyalkylene surfactants, manufactured by Sanyo Chemical Industries, Ltd.), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the PAA. Alternatively, the mixture may comprise no (or be absent of) surfactant.

A weight ratio of nanoparticles to surfactant in the emulsion stabilizer 114 may be about 1:10 to about 10:1 (or about 1:10 to about 1:1, or about 1:5 to about 5:1, or about 1:1 to about 10:1).

The emulsion stabilizer 114 may be included in the precursor emulsion 120 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the PAA.

Examples of matrix fluids 116 may include, but are not limited to, decalin, tetralin, silicone oil, fluorinated silicone oils, perfluorinated silicone oils, polyethylene glycols, alkyl-terminal polyethylene glycols (e.g., $C_1$ to $C_4$ terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. For example, a matrix fluid 116 may comprise (a) decalin and/or tetralin and (b) another of the foregoing fluids. More specifically, the matrix fluid 116 may comprise about 5 wt % to about 40 wt % (or about 5 wt % to about 20 wt %, or about 15 wt % to about 30 wt %, or about 20 wt % to about 40 wt %) of a foregoing fluid (e.g., silicone oil, fluorinated silicone oils, perfluorinated silicone oils, polyethylene glycols, or any combination thereof) in decalin and/or tetralin. When decaline and tetralin are used together, their relative weight ratios may be about 1:99 to about 99:1 (or about 1:99 to about 50:50, or about 25:75 to about 75:25, or about 50:50 to about 99:1).

The matrix fluid 116 preferably has a boiling point (a) greater than the boiling point of the high boiling point solvent 106 and (b) greater than a temperature sufficient to polymerize the PAA. The matrix fluid 116 may be about 150° C. to about 450° C. or greater (or about 150° C. to about 250° C., or about 175° C. to about 300° C., or about 250° C. to about 450° C., or greater).

The matrix fluid 116 may be present in the precursor emulsion 120 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of precursor emulsion 120. The matrix fluid 116 may be present at a weight ratio of the matrix fluid 116 to the mixture 112 ranging from about 50:50 to about 90:10 (or about 50:50 to about 75:25, or about 60:40 to about 80:20, or about 75:25 to about 90:10).

Referring again to FIG. 1, emulsifying 118 the mixture 112, the emulsion stabilizer 114, and the matrix fluid 116 may include combining said components in any order and mixing at a shear rate sufficient enough to disperse the mixture 112 in the matrix fluid 116. For example, the emulsion stabilizer 114 may first be dispersed in the matrix fluid 116 before adding the mixture 112 while at a shear rate sufficient enough to disperse the mixture 112 in the matrix fluid 116. In another example, all three components 112, 114, and 116 may be combined before the shearing begins. In yet another nonlimiting example, the mixture 112 may be mixed with the matrix fluid 116 at a shear rate sufficient enough to disperse the mixture 112 in the matrix fluid 116. Then, the emulsion stabilizer 114 can be added to form the precursor emulsion 120.

Examples of mixing apparatuses used for the emulsifying 118 to produce the precursor emulsion 120 may include, but are not limited to, extruders (e.g., continuous extruders, batch extruders, and the like), stirred reactors, blenders, reactors with inline homogenizer systems, and the like, and apparatuses derived therefrom. Again, water may still be a concern. One skilled in the art will recognize that there are a plurality of mixing apparatus setups, component transfer methods, and mixing methods useful for achieving and processing the precursor emulsion 120 in such a way to mitigate exposure to water.

In the methods described herein, the PAA is heated 122 to cause thermal imidization of the PAA. This heating 122 may occur during and/or after emulsifying 118. Because the PAA in a portion of the dispersed, internal phase of the precursor emulsion 120, the heating 122 yields polyimide microparticles. Heating 122 the precursor emulsion 120 during and/or after formation of said precursor emulsion 120 may be to a temperature sufficient to polymerize the PAA to form polyimide microparticles.

The temperature sufficient to polymerize the PAA may be about 100° C. to about 250° C. (or about 100° C. to about 175° C., or about 150° C. to about 200° C., or about 175° C. to about 250° C.).

Within the method 100, heating 122 the precursor emulsion 120 yields a product 124 comprising the polyimide microparticles, the emulsion stabilizer 114, and the matrix fluid 116. Depending on the temperature of heating, at least a portion of the high boiling point solvent 106 may have evaporated during the heating 122. Therefore, the product 124 may or may not comprise the high boiling point solvent 106. Preferably, most of the high boiling point solvent 106 is maintained during heating 122. Without being limited by theory, it is believed that the presence of the high boiling point solvent 106 promotes porosity within the polyimide microparticles.

Generally, during heating 122 stirring is preferably maintained to keep the internal phase dispersed in the external phase of the oil-in-oil emulsion. This stirring may be the same, less than, or greater than the shear rate sufficient enough to disperse the mixture 112 in the matrix fluid 116.

The precursor emulsion 120 may be maintained at a temperature sufficient to polymerize the PAA for a time sufficient to completely polymerize the PAA, which may take from about 2 hours to about 24 hours or longer (or about 2 hours to about 8 hours, or about 6 hours to about 24 hours, or longer).

The polyimide microparticles are generally not soluble in the matrix fluid 116 or the high boiling point solvent 106. Therefore, separation of the polyimide microparticles from the matrix fluid 116 and the high boiling point solvent 106 may be achieved by filtration and washing (e.g., with methanol, ethanol, acetone, and the like). After separation, the polyimide microparticles may be dried.

Without being limited by theory, it is believed the PAA is dispersed in the high boiling point solvent 106 and, then, in situ polymerized in the internal phase of the precursor emulsion 120. It is believed that this resembles a sol-gel polymerization, which produces a porous morphology rather than a solid particle. Morphologies are illustrated in scanning electron microscopy (SEM) images in the Examples Section below.

The morphology is such that the polyimide forms a porous, irregular scaffold, similar to those seen in sol-gels and/or aerogels. This is in contrast to more regular scaffolds seen in open cell morphologies, closed cell morphologies, and topologically ordered porous structures. The porous, irregular scaffold morphology may comprise interconnected flake-like and/or ribbon-like structures (e.g., FIG. 7D in the Examples) and/or interconnected solidified-polymer melt structure (e.g., FIG. 9C and FIG. 10B in the examples).

The emulsion stabilizer 114 may be coating a portion of a surface (external surface and/or internal surface) of the polyimide microparticles. The coating may comprise emulsion stabilizers 114 (a) disperse on a surface (external surface and/or internal surface) of the polyimide microparticles and/or (b) embedded in a surface (external surface and/or internal surface) of the polyimide microparticles.

The emulsion stabilizer 114 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of an external surface of the polyimide microparticles, where the external surface is the surfaces of the polyimide microparticle within 1 vol % of the perimeter of the polyimide microparticles. The coverage of the emulsion stabilizer 114 on an external surface of the polyimide microparticles may be determined using image analysis of the SEM images.

Further, emulsion stabilizers 114 may agglomerate during the production method 100 and become entrapped within the porous, irregular scaffold of the polyimide microparticle. FIG. 10C illustrates such a trapped agglomerate of emulsion stabilizers 114.

Figure 2:
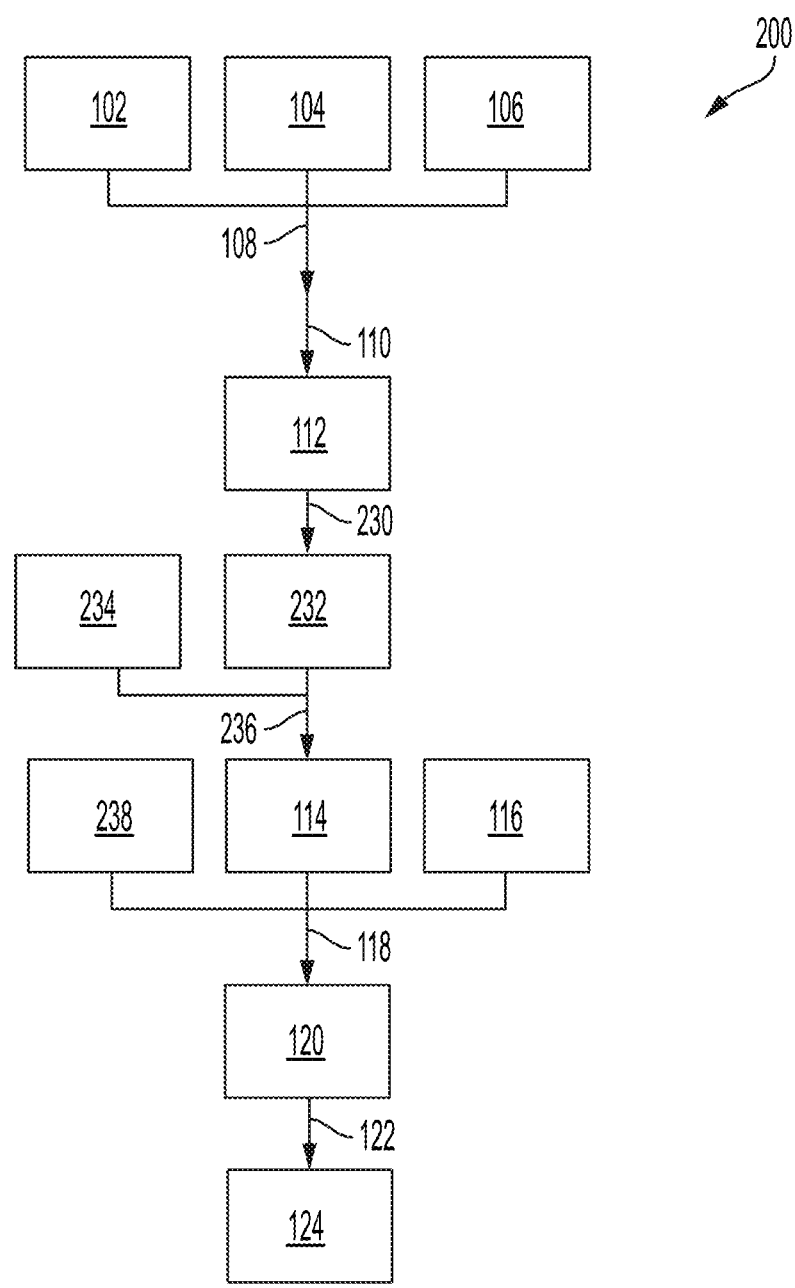
FIG. 2 is another illustrative, nonlimiting example method of the present disclosure for producing polyimide particles.

FIG. 1 is an illustrative, nonlimiting example method 100 of the present disclosure for producing polyimide particles. FIG. 2 is another illustrative, nonlimiting example method 200 of the present disclosure for producing polyimide particles. Reference numbers in FIG. 2 are repeated where the disclosure from FIG. 1 applies to the method 200 of FIG. 2.

In the method 200 illustrated in FIG. 2, the same steps, conditions, and components disclosed relative to FIG. 1 may be used to produce a mixture 112 comprising PAA and the high boiling point solvent 106. The variation of the method 200 from the method 100 is that the PAA 232 may be separated 230 from the mixture 230, which reduces contamination from any unreacted diamine 102 and dianhydride 104. Separation 230 may be achieved by adding a PAA non-solvent (i.e., a fluid in which PAA is not soluble) to the mixture 112 that causes the PAA 232 to precipitate from the mixture 112. Examples of PAA non-solvents include, but are not limited to, water, acetone, methanol, and the like, and any combination thereof. It should be noted that if water is used, extensive drying is preferable so that water is minimally or not present in the precursor emulsion 120. Further, when using water, the temperature of the PAA 232 preferably does not exceed 50° C. to mitigate any unwanted reactions. Therefore, drying the PAA when water is used as the PAA non-solvent is preferably performed at room temperature (e.g., 25° C.) with reduced pressures (e.g., in a vacuum oven or outer suitable apparatus at room temperature).

After separation 230, the PAA 232 preferably comprises 95 wt % or greater PAA. That is, contaminants like unreacted diamine 102, unreacted dianhydride 104, any remaining high boiling point solvent 106, and any PAA non-solvent is 5 wt % or less (or 0 wt % to 5 wt %, or 0.1 wt % to 3 wt %, or 0 wt % to 1 wt %).

The PAA 232 may then be dissolved 236 in a second high boiling point solvent 234 to yield a PAA solution 232. Examples of second high boiling point solvents 234 may include, but are not limited to, DMF; DMAc; N,N-diethylformamide; N,N-diethylacetamide; N-methylpyrrolidone, DMSO; sulfolane; and the like; and any combination thereof.

The PAA solution 232 may comprise about 10 wt % to about 50 wt % (about 10 wt % to about 25 wt %, or about 15 wt % to about 30 wt %, or about 25 wt % to about 50 wt %) of the PAA 232 and about 50 wt % to about 90 wt % (or about 75 wt % to about 90 wt %, or about 70 wt % to about 85 wt %, or about 50 wt % to about 75 wt %) of the second high boiling point solvent 234.

In the illustrated method 200, the PAA solution 232 is used like the mixture 112 in the method of FIG. 1. That is, as illustrated in FIG. 2, the PAA solution 232 is emulsified 118 with an emulsion stabilizer 114 and a matrix fluid 116 that is immiscible with the second high boiling point solvent 234 to produce a precursor emulsion 120. Without being limited by theory, it is believed that the resultant precursor emulsion 120 in an oil-in-oil emulsion having an external phase comprising the matrix fluid 116 and an internal phase comprising the PAA 232 dispersed in the second high boiling point solvent 234 where the emulsion stabilizer 114 predominantly resides at an interface between the external phase and the internal phase. Accordingly, the disclosure of the mixture 112 relative to emulsifying 118 for FIG. 1 applies to the PAA solution 232 of FIG. 2. For example, the PAA solution 232 may be present at a weight ratio of the matrix fluid 116 to the PAA solution 232 ranging from about 50:50 to about 90:10 (or about 50:50 to about 75:25, or about 60:40 to about 80:20, or about 75:25 to about 90:10). Further, the order of combining the components 238, 114, and 116 is the same as that described for components 112, 114, and 116 of FIG. 1.

The illustrated method 200 then includes the steps, compositions, and method parameter of those described in FIG. 1 to achieve the product 124 and any other described further steps including, but not limited to, filtering, washing, and drying. Additionally, the believed theories of how the PAA polymerizes to form polyimide particles with porous, irregular scaffold morphologies applies to the method 200 of FIG. 2.

The polyimide microparticles of the present disclosure (e.g., prepared by the method 100 of FIG. 1, method 200 of FIG. 2, or a variation of either method) may comprise about 90 wt % or greater (or about 90 wt % to about 100 wt %, or about 95 wt % to about 100 wt %, or about 98 wt % to about 100 wt %, or about 99 wt % to about 100 wt %) of polyimide with the balance being emulsion stabilizer and unpolymerized PAA. Preferably, the amount of unpolymerized PAA is 1 wt % or less (or 0 wt % to about 1 wt %, or 0 wt % to about 0.1 wt %). The polyimide microparticles of the present disclosure may consist of polyimide, emulsion stabilizer, and unpolymerized PAA. The polyimide microparticles of the present disclosure may consist of polyimide and emulsion stabilizer. The polyimide microparticles of the present disclosure may consist of polyimide.

The polyimide microparticles of the present disclosure may have an average diameter (D50 based on volume) of about 10 µm to about 200 µm, (or about 10 µm to about 50 µm, or about 25 µm to about 100 µm, or about 75 µm to about 150 µm, or about 125 µm to about 200 µm).

The polyimide microparticles of the present disclosure may have a D10 of about 0.5 µm to about 50 µm, (or about 0.5 µm to about 25 µm, or about 5 µm to about 30 µm, or about 10 µm to about 50 µm), a D50 of about 10 µm to about 200 µm, (or about 10 µm to about 50 µm, or about 25 µm to about 100 µm, or about 75 µm to about 150 µm, or about 125 µm to about 200 µm), and a D90 of about 50 µm to about 300 µm, (or about 50 µm to about 150 µm, or about 75 µm to about 200 µm, or about 100 µm to about 300 µm), wherein D10<D50<D90.

The polyimide microparticles of the present disclosure may have a diameter span of about 0.2 to about 10 (or about 0.2 to about 2, or about 0.4 to about 1, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow.

The polyimide microparticles of the present disclosure may have a circularity of about 0.9 or greater (or about 0.90 to about 1.0, or about 0.93 to about 0.99, or about 0.95 to about 0.99, or about 0.97 to about 0.99, or about 0.98 to 1.0).

The polyimide microparticles of the present disclosure may have an angle of repose of about 25° to about 45° (or about 25° to about 35°, or about 30° to about 40°, or about 35° to about 45°).

The polyimide microparticles of the present disclosure may have a Hausner ratio of about 1.0 to about 1.5 (or about 1.0 to about 1.2, or about 1.1 to about 1.3, or about 1.2 to about 1.35, or about 1.3 to about 1.5).

The polyimide microparticles of the present disclosure may have a bulk density of about 0.2 g/cm$^3$ to about 0.8 g/cm$^3$ (or about 0.2 g/cm$^3$ to about 0.4 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The polyimide microparticles of the present disclosure may have a BET surface area of about 30 m$^2$/g to about 500 m$^2$/g (or about 30 m$^2$/g to about 150 m$^2$/g, or about 100 m$^2$/g to about 250 m$^2$/g, or about 200 m$^2$/g to about 350 m$^2$/g, or about 300 m$^2$/g to about 500 m$^2$/g).

The polyimide microparticles of the present disclosure may have may have a sintering window of about 15° C. to about 35° C. (or about 15° C. to about 25° C., or about 25° C. to about 35° C.).

The polyimide microparticles of the present disclosure may have a melting point of about 250° C. to about 400° C. (or about 250° C. to about 350° C., or about 300° C. to about 400° C.).

The polyimide microparticles of the present disclosure may have a glass transition temperature of about 200° C. to about 350° C. (or about 200° C. to about 300° C., or about 250° C. to about 350° C.).

The polyimide microparticles of the present disclosure may have a decomposition temperature of about 400° C. to about 500° C. (or about 400° C. to about 475° C., or about 450° C. to about 500° C.).

The polyimide microparticles of the present disclosure may have a crystallization temperature of about 250° C. to about 300° C. (or about 250° C. to about 275° C., or about 275° C. to about 300° C.).

The polyimide microparticles of the present disclosure may have a crystallinity of about 20% to about 60% (or about 20% to about 40%, or about 30% to about 50%, or about 40% to about 60%).

The polyimide microparticles of the present disclosure may have an MFI flow rate of about 0.5 g/10 min to about 10 g/10 min (or about 0.5 g/10 min to about 2 g/10 min, or about 1 g/10 min to about 5 g/10 min, or about 3 g/10 min to about 10 g/10 min.

Applications

The polyimide microparticles of the present disclosure may be used to produce a variety of articles by SLS additive manufacturing methods. By way of nonlimiting example, SLS additive manufacturing methods of the present disclosure may comprise: depositing polyimide microparticles of the present disclosure optionally in combination with thermoplastic polymer particles (preferably of similar size and shape but may be porous or solid) upon a surface (e.g., in layers and/or in a specified shape), and once deposited, heating at least a portion of the polyimide microparticles to promote consolidation thereof and form a consolidated body (or object). The consolidated body may have a void percentage (percent of volume that is void) of about 20% or less (e.g., 5% to about 20%, or about 5% to about 15%, or about 10% to about 20%) after being consolidated. For example, heating and consolidation of the polyimide microparticles and optionally the thermoplastic polymer particles may take place in a 3-D printing apparatus employing a laser, such that heating and consolidation take place by selective laser sintering.

Examples of thermoplastic polymers that may comprise all or a portion of the thermoplastic polymer particles may include, but are not limited to, polyamides, polyurethanes, polyethylenes (preferably functionalized polyethylenes), polypropylenes (preferably functionalized polypropylenes), polyacetals (may be in presence of polyethylene glycol), polycarbonates (may be in presence of compatibilisers such as maleated polyalkene (maleated PP or EPR), polyesteramide, acrylonitrile butadiene styrene (ABS) and maleated ABS (MA-g-ABS), butadiene-styrene-acrylonitrile-acrylate copolymer, styrene maleic anhydride (SMA), styrene-propylene ethylene-butylene-styrene (SEBS) and MA-g-SEBS, polyethyloxazoline, ethylene-glycidyl methacrylate graft copolymer, for example), polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene celastomer (EPR) (may be in presence of compatibilisers such as ethylene-propylene copolymers grafted with MA, for example), poly(4-methyl-1-pentene), polyhexamethylene terephthalate, polystyrenes (e.g., statistical or block styrene copolymers, graft styrenes, or compatibilizing groups, for example), polyvinyl chlorides, polytetrafluoroethenes, polyesters (e.g., polylactic acid), polyethers, polyether sulfones (PESU), polysulfones (PSU) (preferably functionalized PSU), polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyamides, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF) (may be under compatibilization using polyetheramide block copolymers), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure.

Examples of articles that may be produced by such methods where the polyimide microparticles (optionally in combination with thermoplastic polymer particles) may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, high temperature fuel cell components, chemical and environmental applications, military applications, solar cells, flexible printed circuits, and the like. Further, particles may be useful in applications that include, but are not limited to, paints, powder coatings, ink jet materials, electrophotographic toners, 3D printing, and the like.

Additionally, because the morphology of the polyimide microparticles increases the surface area of said microparticles as compared to solid microparticles of the same dimensions and the polyimide offers the high temperature stability, the polyimide microparticles described herein suitable for use as catalyst supports, in the production of high-surface area membranes, gas storage, carbon capture, removal of pollutants, molecular separation, catalysis, drug delivery, sensing, polymeric molecular sieve membranes, and the like.

Example Embodiments

A first nonlimiting example embodiment is a method comprising: combining a diamine and a dianhydride in a first dry, high boiling point solvent; reacting the diamine and the dianhydride to produce a mixture comprising poly(amic acid) (PAA) and the first dry, high boiling point solvent; emulsifying the mixture in a matrix fluid that is immiscible with the first dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles.

The first nonlimiting example embodiment may further include one or more of: Element 1: wherein the diamine is selected from the diamines described herein; Element 2: wherein the dianhydride is selected from the dianhydrides described herein; Element 3: wherein the reacting of the diamine and the dianhydride is at about 40° C. or less; Element 4: wherein the reacting of the diamine and the dianhydride is for about 6 hours to about 48 hours; Element 5: wherein a stoichiometric ratio of the diamine to the diahydride is about 2:1 to about 1:2; Element 6: wherein performing the reacting of the diamine and the dianhydride comprises: dissolving the diamine in the first dry, high boiling point solvent; and adding the dianhydride to the first dry, high boiling point solvent having the diamine dissolved therein; Element 7: wherein the emulsion stabilizer comprises a surfactant and/or a nanoparticle; Element 8: wherein the emulsion stabilizer is present as a coating on a surface of the polyimide particles; Element 9: wherein the temperature sufficient to polymerize the PAA is about 100° C. to about 250° C.; Element 10: the method further comprising: washing the polyimide microparticles; and drying the polyimide microparticles after washing; Element 11: wherein the polyimide microparticles have a D10 of about 0.5 µm to about 50 µm, a D50 of about 10 µm to about 200 µm, and a D90 of about 50 µm to about 300 µm, wherein D10<D50<D90; Element 12: wherein the polyimide microparticles have a diameter span of about 0.2 to about 10; Element 13: wherein the polyimide microparticles have a circularity of about 0.9 or greater (or about 0.90 to about 1.0); Element 14: wherein the polyimide microparticles have an angle of repose of about 25° to about 45°; Element 15: wherein the polyimide microparticles have a Hausner ratio of about 1.0 to about 1.5; Element 16: wherein the polyimide microparticles have a bulk density of about 0.2 g/cm$^3$ to about 0.8 g/cm$^3$; Element 17: wherein the polyimide microparticles have a BET surface area of about 30 m$^2$/g to about 500 m$^2$/g; Element 18: wherein the polyimide microparticles have a sintering window of about 15° C. to about 35° C.; Element 19: wherein the polyimide microparticles have a melting point of about 250° C. to about 400° C.; Element 20: wherein the polyimide microparticles have a glass transition temperature of about 200° C. to about 350° C.; Element 21: wherein the polyimide microparticles have a decomposition temperature of about 400° C. to about 500° C.; Element 22: wherein the polyimide microparticles have a crystallization temperature of about 250° C. to about 300° C.; Element 23: wherein the polyimide microparticles have a crystallinity of about 20% to about 60%; Element 24: wherein the polyimide microparticles have an MFI flow rate of about 0.5 g/10 min to about 10 g/10 min; and Element 25: wherein the polyimide microparticles have a porous, irregular scaffold morphology comprising (a) flake-like structures, (b) ribbon-like structures, (c) and/or interconnected solidified-polymer melt structures. Examples of combinations include, but are not limited to, Element 1 in combination with one or more of Elements 2-25; Element 2 in combination with one or more of Elements 3-25; Element 3 in combination with one or more of Elements 4-25; Element 4 in combination with one or more of Elements 5-25; Element 5 in combination with one or more of Elements 6-25; Element 6 in combination with one or more of Elements 7-25; Element 7 in combination with one or more of Elements 8-25; Element 8 in combination with one or more of Elements 9-25; Element 1 in combination with one or more of Elements 9-25; Element 1 in combination with one or more of Elements 10-25; Element 10 in combination with one or more of Elements 11-25; Element 11 in combination with one or more of Elements 12-25; Element 12 in combination with one or more of Elements 13-25; Element 13 in combination with one or more of Elements 14-25; Element 14 in combination with one or more of Elements 15-25; Element 15 in combination with one or more of Elements 16-25; Element 16 in combination with one or more of Elements 17-25; Element 17 in combination with one or more of Elements 18-25; Element 18 in combination with one or more of Elements 19-25; Element 19 in combination with one or more of Elements 20-25; Element 20 in combination with one or more of Elements 21-25; Element 21 in combination with one or more of Elements 22-25; and two or more of Elements 22-25 in combination.

A second nonlimiting example embodiment is a composition comprising: the polyimide microparticles produced by the method of the first nonlimiting example embodiment.

A third nonlimiting example embodiment is a method comprising: depositing the polyimide microparticles of the second nonlimiting example embodiment optionally in combination with thermoplastic polymer particles (preferably of similar size and shape but may be porous or solid) upon a surface (e.g., in layers and/or in a specified shape), and once deposited, heating at least a portion of the polyimide microparticles to promote consolidation thereof and form a consolidated body (or object).

A fourth nonlimiting example embodiment is a method comprising: combining a diamine and a dianhydride in a first dry, high boiling point solvent; reacting the diamine and the dianhydride to produce a mixture comprising poly(amic acid) (PAA) and the first dry, high boiling point solvent; extracting the PAA from the mixture; dissolving the PAA in a second dry, high boiling point solvent to produce a PAA solution; emulsifying the PAA solution in a matrix fluid that is immiscible with the second dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles. The fourth nonlimiting example embodiment may further include one or more of: Element 1; Element 2; Element 3; Element 4; Element 5; Element 6; Element 7; Element 8; Element 9; Element 10; Element 11; Element 12; Element 13; Element 14; Element 15; Element 16; Element 17; Element 18; Element 19; Element 20; Element 21; Element 22; Element 23; Element 24; and Element 25, including in the combinations described above.

A fifth nonlimiting example embodiment is a composition comprising: the polyimide microparticles produced by the method of the fourth nonlimiting example embodiment.

A sixth nonlimiting example embodiment is a method comprising: depositing the polyimide microparticles of the fifth nonlimiting example embodiment optionally in combination with thermoplastic polymer particles (preferably of similar size and shape but may be porous or solid) upon a surface (e.g., in layers and/or in a specified shape), and once deposited, heating at least a portion of the polyimide microparticles to promote consolidation thereof and form a consolidated body (or object).

A seventh nonlimiting example embodiment is a composition comprising: microparticles comprising polyimide, wherein the microparticles have a porous, irregular scaffold morphology comprising (a) flake-like structures, (b) ribbon-like structures, (c) and/or interconnected solidified-polymer melt structures. The fifth nonlimiting example embodiment may further include one or more of: Element 11; Element 12; Element 13; Element 14; Element 15; Element 16; Element 17; Element 18; Element 19; Element 20; Element 21; Element 22; Element 23; and Element 24, including in the combinations described above.

An eighth nonlimiting example embodiment is a method comprising: depositing the polyimide microparticles of the seventh nonlimiting example embodiment optionally in combination with thermoplastic polymer particles (preferably of similar size and shape but may be porous or solid) upon a surface (e.g., in layers and/or in a specified shape), and once deposited, heating at least a portion of the polyimide microparticles to promote consolidation thereof and form a consolidated body (or object).

CLAUSES

Clause 1: A method comprising: combining a diamine and a dianhydride in a first dry, high boiling point solvent;

reacting the diamine and the dianhydride to produce a mixture comprising poly(amic acid) (PAA) and the first dry, high boiling point solvent; emulsifying the mixture in a matrix fluid that is immiscible with the first dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles.

Clause 2: The method of Clause 1, wherein the diamine is selected from the diamines described herein.

Clause 3: The method of Clause 1, wherein the dianhydride is selected from the dianhydrides described herein.

Clause 4: The method of Clause 1, wherein the reacting of the diamine and the dianhydride is at about 40° C. or less.

Clause 5: The method of Clause 1, wherein the reacting of the diamine and the dianhydride is for about 6 hours to about 48 hours.

Clause 6: The method of Clause 1, wherein a stoichiometric ratio of the diamine to the diahydride is about 2:1 to about 1:2.

Clause 7: The method of Clause 1, wherein performing the reacting of the diamine and the dianhydride comprises: dissolving the diamine in the first dry, high boiling point solvent; and adding the dianhydride to the first dry, high boiling point solvent having the diamine dissolved therein.

Clause 8: The method of Clause 1, wherein the emulsion stabilizer comprises a surfactant and/or a nanoparticle.

Clause 9: The method of Clause 1, wherein the emulsion stabilizer is present as a coating on a surface of the polyimide particles.

Clause 10: The method of Clause 1, wherein the temperature sufficient to polymerize the PAA is about 100° C. to about 250° C.

Clause 11: The method of Clause 1, the method further comprising: washing the polyimide microparticles; and drying the polyimide microparticles after washing.

Clause 12: The method of Clause 1, wherein the polyimide microparticles have a D10 of about 0.5 μm to about 50 μm, a D50 of about 10 μm to about 200 μm, a D90 of about 50 μm to about 300 μm, wherein D10<D50<D90.

Clause 13: The method of Clause 1, wherein the polyimide microparticles have a diameter span of about 0.2 to about 10.

Clause 14: The method of Clause 1, wherein the polyimide microparticles have a circularity of about 0.9 or greater (or about 0.90 to about 1.0).

Clause 15: The method of Clause 1, wherein the polyimide microparticles have an angle of repose of about 25° to about 45°.

Clause 16: The method of Clause 1, wherein the polyimide microparticles have a Hausner ratio of about 1.0 to about 1.5.

Clause 17: The method of Clause 1, wherein the polyimide microparticles have a bulk density of about 0.2 g/cm$^3$ to about 0.8 g/cm$^3$.

Clause 18: The method of Clause 1, wherein the polyimide microparticles have a BET surface area of about 30 m$^2$/g to about 500 m$^2$/g.

Clause 19: The method of Clause 1, wherein the polyimide microparticles have a sintering window of about 15° C. to about 35° C.

Clause 20: The method of Clause 1, wherein the polyimide microparticles have a melting point of about 250° C. to about 400° C.

Clause 21: The method of Clause 1, wherein the polyimide microparticles have a glass transition temperature of about 200° C. to about 350° C.

Clause 22: The method of Clause 1, wherein the polyimide microparticles have a decomposition temperature of about 400° C. to about 500° C.

Clause 23: The method of Clause 1, wherein the polyimide microparticles have a crystallization temperature of about 250° C. to about 300° C.

Clause 24: The method of Clause 1, wherein the polyimide microparticles have a crystallinity of about 20% to about 60%.

Clause 25: The method of Clause 1, wherein the polyimide microparticles have an MFI flow rate of about 0.5 g/10 min to about 10 g/10 min.

Clause 26: The method of Clause 1, wherein the polyimide microparticles have a porous, irregular scaffold morphology comprising (a) flake-like structures, (b) ribbon-like structures, (c) and/or interconnected solidified-polymer melt structures.

Clause 27: A composition comprising the polyimide microparticles of Clause 1.

Clause 28: A method comprising: depositing the polyimide microparticles of Clause 27 optionally in combination with thermoplastic polymer particles upon a surface, and once deposited, heating at least a portion of the polyimide microparticles to promote consolidation thereof and form a consolidated body (or object).

Clause 29: A method comprising: combining a diamine and a dianhydride in a first dry, high boiling point solvent; reacting the diamine and the dianhydride to produce a mixture comprising poly(amic acid) (PAA) and the first dry, high boiling point solvent; extracting the PAA from the mixture; dissolved the PAA in a second dry, high boiling point solvent to produce a PAA solution; emulsifying the PAA solution in a matrix fluid that is immiscible with the second dry, high boiling point solvent using an emulsion stabilizer to form a precursor emulsion that is an oil-in-oil emulsion; and heating the precursor emulsion during and/or after formation to a temperature sufficient to polymerize the PAA to form polyimide microparticles Clause 30: The method of Clause 29, wherein the diamine is selected from the diamines described herein.

Clause 31: The method of Clause 29, wherein the dianhydride is selected from the dianhydrides described herein.

Clause 32: The method of Clause 29, wherein the reacting of the diamine and the dianhydride is at about 40° C. or less.

Clause 33: The method of Clause 29, wherein the reacting of the diamine and the dianhydride is for about 6 hours to about 48 hours.

Clause 34: The method of Clause 29, wherein a stoichiometric ratio of the diamine to the diahydride is about 2:1 to about 1:2.

Clause 35: The method of Clause 29, wherein performing the reacting of the diamine and the dianhydride comprises: dissolving the diamine in the first dry, high boiling point solvent; and adding the dianhydride to the first dry, high boiling point solvent having the diamine dissolved therein.

Clause 36: The method of Clause 29, wherein the emulsion stabilizer comprises a surfactant and/or a nanoparticle.

Clause 37: The method of Clause 29, wherein the emulsion stabilizer is present as a coating on a surface of the polyimide particles.

Clause 38: The method of Clause 29, wherein the temperature sufficient to polymerize the PAA is about 100° C. to about 250° C.

Clause 39: The method of Clause 29, the method further comprising: washing the polyimide microparticles; and drying the polyimide microparticles after washing.

Clause 40: The method of Clause 29, wherein the polyimide microparticles have a D10 of about 0.5 µm to about 50 µm, a D50 of about 10 µm to about 200 µm, and a D90 of about 50 µm to about 300 µm, wherein D10<D50<D90.

Clause 41: The method of Clause 29, wherein the polyimide microparticles have a diameter span of about 0.2 to about 10.

Clause 42: The method of Clause 29, wherein the polyimide microparticles have a circularity of about 0.9 or greater (or about 0.90 to about 1.0).

Clause 43: The method of Clause 29, wherein the polyimide microparticles have an angle of repose of about 25° to about 45°.

Clause 44: The method of Clause 29, wherein the polyimide microparticles have a Hausner ratio of about 1.0 to about 1.5.

Clause 45: The method of Clause 29, wherein the polyimide microparticles have a bulk density of about 0.2 $g/cm^3$ to about 0.8 $g/cm^3$.

Clause 46: The method of Clause 29, wherein the polyimide microparticles have a BET surface area of about 30 $m^2/g$ to about 500 $m^2/g$.

Clause 47: The method of Clause 29, wherein the polyimide microparticles have a sintering window of about 15° C. to about 35° C.

Clause 48: The method of Clause 29, wherein the polyimide microparticles have a melting point of about 250° C. to about 400° C.

Clause 49: The method of Clause 29, wherein the polyimide microparticles have a glass transition temperature of about 200° C. to about 350° C.

Clause 50: The method of Clause 29, wherein the polyimide microparticles have a decomposition temperature of about 400° C. to about 500° C.

Clause 51: The method of Clause 29, wherein the polyimide microparticles have a crystallization temperature of about 250° C. to about 300° C.

Clause 52: The method of Clause 29, wherein the polyimide microparticles have a crystallinity of about 20% to about 60%.

Clause 53: The method of Clause 29, wherein the polyimide microparticles have an MFI flow rate of about 0.5 g/10 min to about 10 g/10 min.

Clause 54: The method of Clause 29, wherein the polyimide microparticles have a porous, irregular scaffold morphology comprising (a) flake-like structures, (b) ribbon-like structures, (c) and/or interconnected solidified-polymer melt structures.

Clause 55: A composition comprising the polyimide microparticles of Clause 29.

Clause 56: A method comprising: depositing the polyimide microparticles of Clause 55 optionally in combination with thermoplastic polymer particles upon a surface, and once deposited, heating at least a portion of the polyimide microparticles to promote consolidation thereof and form a consolidated body (or object).

Clause 57: A composition comprising: microparticles comprising polyimide, wherein the microparticles have a porous, irregular scaffold morphology comprising (a) flake-like structures, (b) ribbon-like structures, (c) and/or interconnected solidified-polymer melt structures.

Clause 58: The composition of Clause 57, wherein the polyimide microparticles have a D10 of about 0.5 µm to about 50 µm, a D50 of about 10 µm to about 200 µm, and a D90 of about 50 µm to about 300 µm, wherein D10<D50<D90.

Clause 59: The composition of Clause 57, wherein the polyimide microparticles have a diameter span of about 0.2 to about 10.

Clause 60: The composition of Clause 57, wherein the polyimide microparticles have a circularity of about 0.9 or greater (or about 0.90 to about 1.0).

Clause 61: The composition of Clause 57, wherein the polyimide microparticles have an angle of repose of about 25° to about 45°.

Clause 62: The composition of Clause 57, wherein the polyimide microparticles have a Hausner ratio of about 1.0 to about 1.5.

Clause 63: The composition of Clause 57, wherein the polyimide microparticles have a bulk density of about 0.2 $g/cm^3$ to about 0.8 $g/cm^3$.

Clause 64: The composition of Clause 57, wherein the polyimide microparticles have a BET surface area of about 30 $m^2/g$ to about 500 $m^2/g$.

Clause 65: The composition of Clause 57, wherein the polyimide microparticles have a sintering window of about 15° C. to about 35° C.

Clause 66: The composition of Clause 57, wherein the polyimide microparticles have a melting point of about 250° C. to about 400° C.

Clause 67: The composition of Clause 57, wherein the polyimide microparticles have a glass transition temperature of about 200° C. to about 350° C.

Clause 68: The composition of Clause 57, wherein the polyimide microparticles have a decomposition temperature of about 400° C. to about 500° C.

Clause 69: The composition of Clause 57, wherein the polyimide microparticles have a crystallization temperature of about 250° C. to about 300° C.

Clause 70: The composition of Clause 57, wherein the polyimide microparticles have a crystallinity of about 20% to about 60%.

Clause 71: The composition of Clause 57, wherein the polyimide microparticles have an MFI flow rate of about 0.5 g/10 min to about 10 g/10 min.

Clause 72: The composition of Clause 57, wherein the polyimide microparticles have a porous, irregular scaffold morphology comprising (a) flake-like structures, (b) ribbon-like structures, (c) and/or interconnected solidified-polymer melt structures.

Clause 73: A composition comprising the polyimide microparticles of Clause 29.

Clause 74: A method comprising: depositing the polyimide microparticles of Clause 57 optionally in combination with thermoplastic polymer particles upon a surface, and once deposited, heating at least a portion of the polyimide microparticles to promote consolidation thereof and form a consolidated body (or object).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1—Polycondensation step: A three neck 250 mL round bottom flask equipped with magnetic stirrer and nitrogen inlet/outlet was charged with 1,12-diaminododecane (9.11 g, 98%, SigmaAldrich) and anhydrous 1-methyl-2-pyrrolidinone (100 g, 99.5%, Sigma Aldrich) was added using cannula. The mixture was stirred at 300 rpm at 80° C. for 1 hour and cooled down to room temperature under inert nitrogen atmosphere. Then, pyromellitic dianhydride (9.990 g, 97%, Sigma Aldrich) was added in five portions with one-hour time intervals between each portion. After complete addition of pyromellitic dianhydride, the reaction continued for 24 hours at room temperature to complete polymerization and PAA formation as a yellowish viscose liquid. The resulting PAA precipitated by adding 200 mL deionized water to the reactor. The obtained colloidal mixture was filtered off using Buchner funnel, washed with methanol, formic acid, and acetone one time each. The resulting wet cake dried under vacuum for two days to give a white powder of PAA in quantitative yields.

The presence of PAA was confirmed using infrared spectroscopy based on the presence of peaks at 1560 cm$^{-1}$ and 1698 cm$^{-1}$ and the broad peak at 2400 cm$^{-1}$ to 3300 cm$^{-1}$ (evidence of the presence of deprotonated carboxylic acid functional groups) and a peak at 1703 cm$^{-1}$ (evidence of the presence of amide functional groups).

Example 2—Emulsion sol-gel imidization step: A three-neck 250 mL glass cylindrical reactor equipped with an overhead stirrer, a P4 impeller, nitrogen inlet/outlet, and electronic thermometer charged with DMF solution of PAA (2.30 g total, 20% PAA in DMF), decalin solution of PDMS (10 k cSt PDMS, 11.5 g total, 20% PDMS in decalin), and polystyrene-co-acrylate-based organic additive (0.005 g, about 1 wt % of the PAA). The mixture was stirred at room temperature and 700 rpm for 15 min, heated to 145° C. over 30 min then maintained at 145° C. for 3 hours. The obtained polyimide microparticles were filtered using Buchner funnel, washed with acetone, and dried overnight at 80° C.

Using infrared spectroscopy, the disappearance of peaks at 1560 cm$^{-1}$ and 1698 cm-1 and the broad peak at 2400 cm$^{-1}$ to 3300 cm$^{-1}$ (evidence of no deprotonated carboxylic acid functional groups) and the appearance of non-identical twin peaks at 1698 cm$^{-1}$ and 1768 cm cm$^{-1}$ (evidence of the presence of imide functional groups) confirms the complete imidization of PAA to polyimide.

Figure 3:
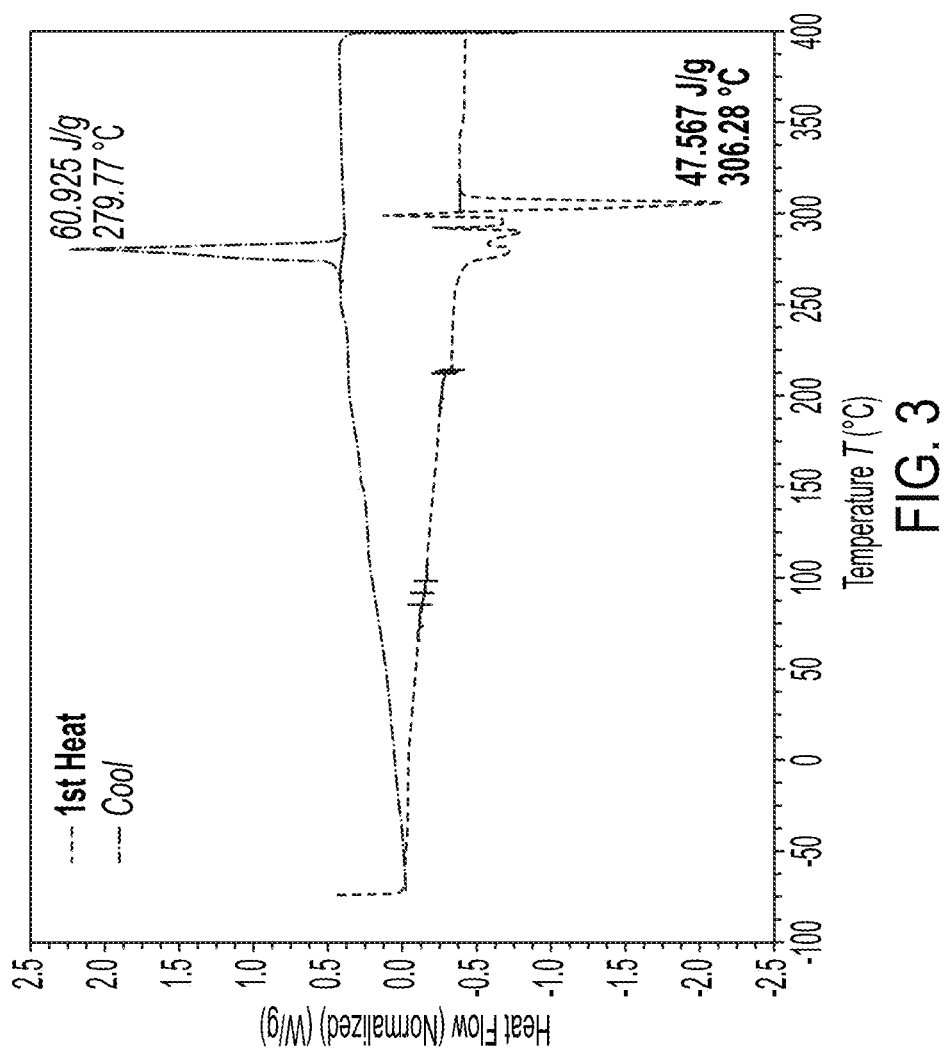
FIG. 3 is the differential scanning calorimetry (DSC) analysis of polyimide microparticles of the present disclosure.

FIG. 3 is the differential scanning calorimetry (DSC) analysis of the polyimide microparticles showed that the polymer has a melting point of 306° C. and a crystallization temperature of 280° C., which is a 26° C. sintering window that is wide enough for successful SLS additive manufacturing methods. Further, DSC analysis confirms that the polyimide microparticles have thermoplasticity and semi-crystalline behavior, which is not usual or expected in polyimides.

Based on a thermogravimetric analysis (TGA), a decomposition temperature of the polyimide microparticles was 466° C., which illustrates high thermal stability.

Figure 4:
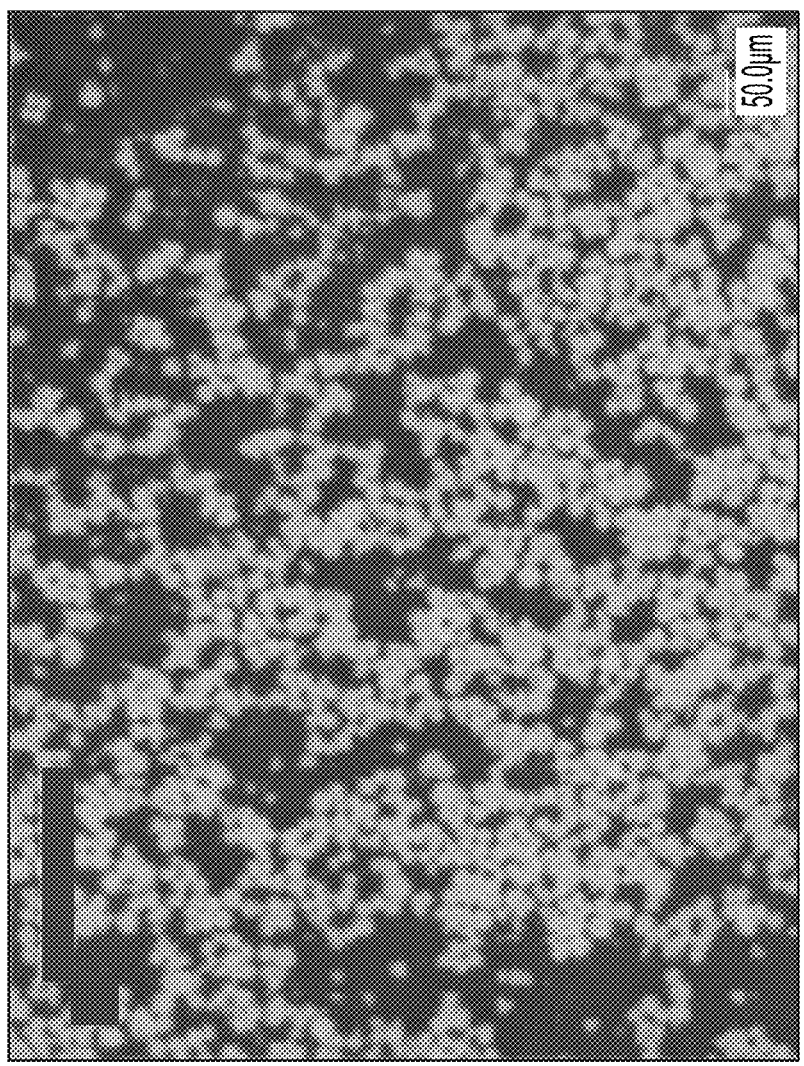
FIG. 4 is an optical microscopy image of polyimide microparticles of the present disclosure.
Figure 5A:
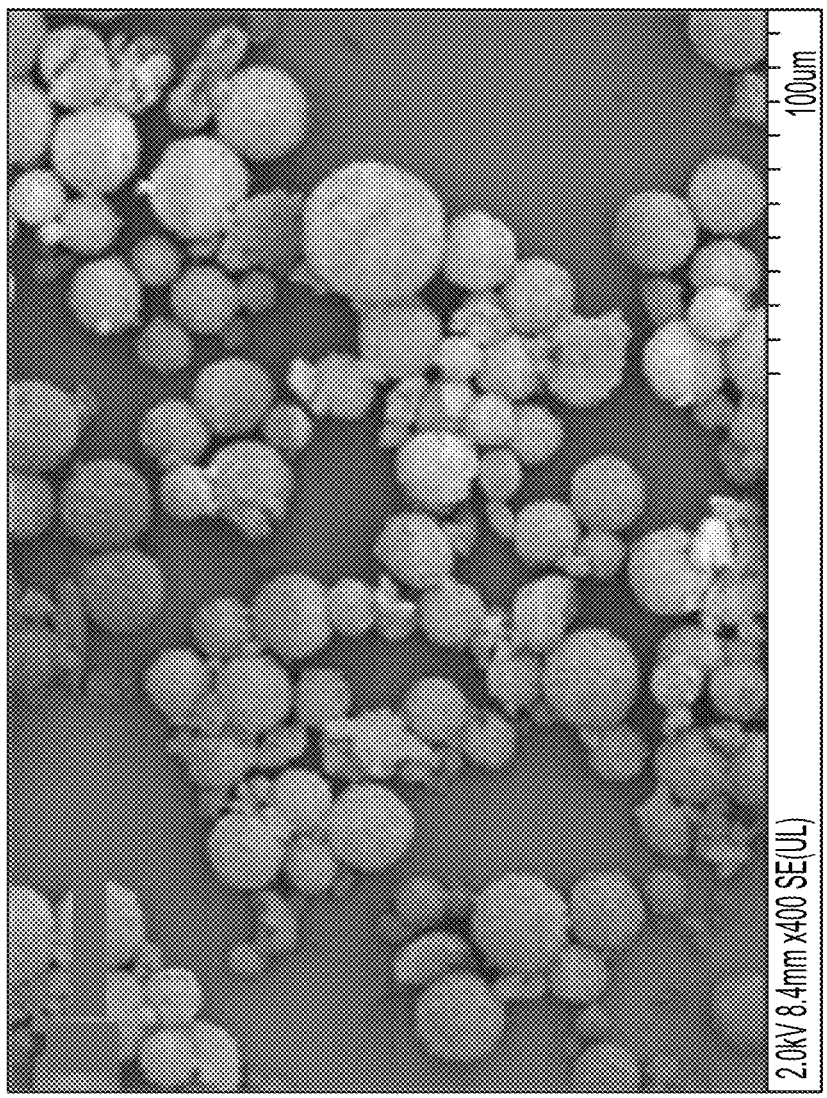
FIGS. 5A-5C are scanning electron microscopy (SEM) images of polyimide microparticles of the present disclosure.
Figure 5B:
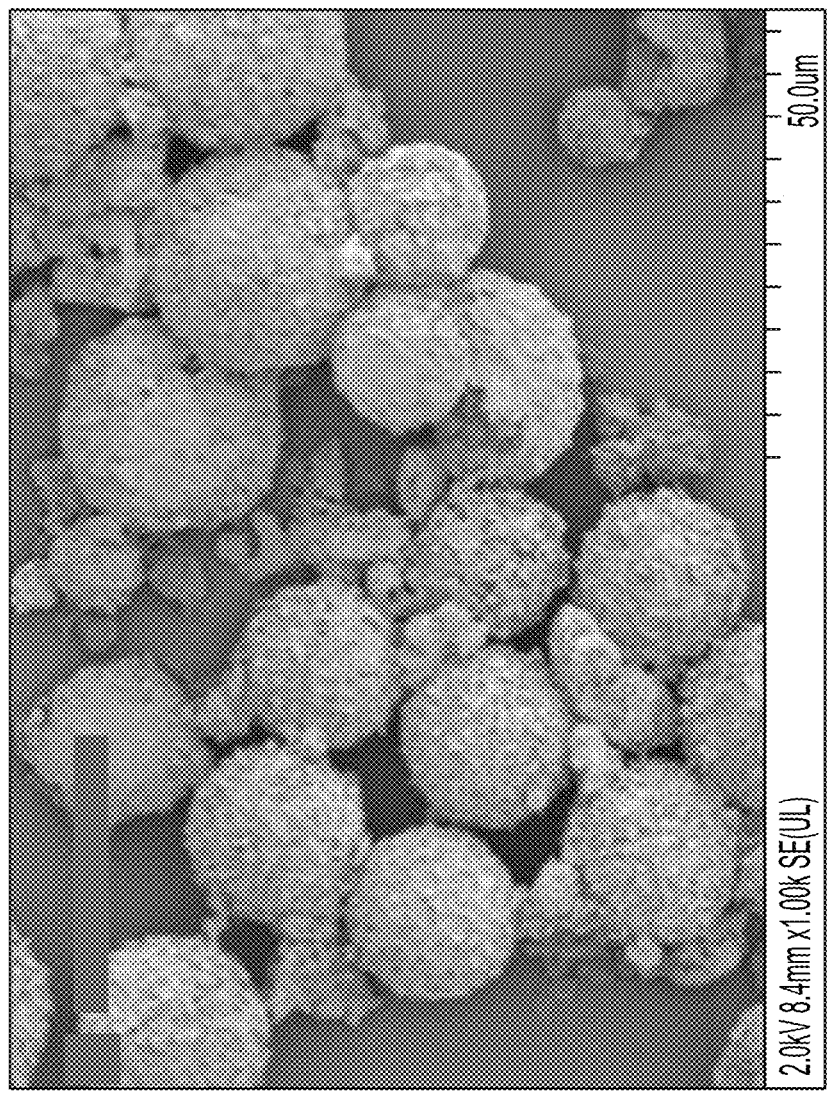
Figure 5C:
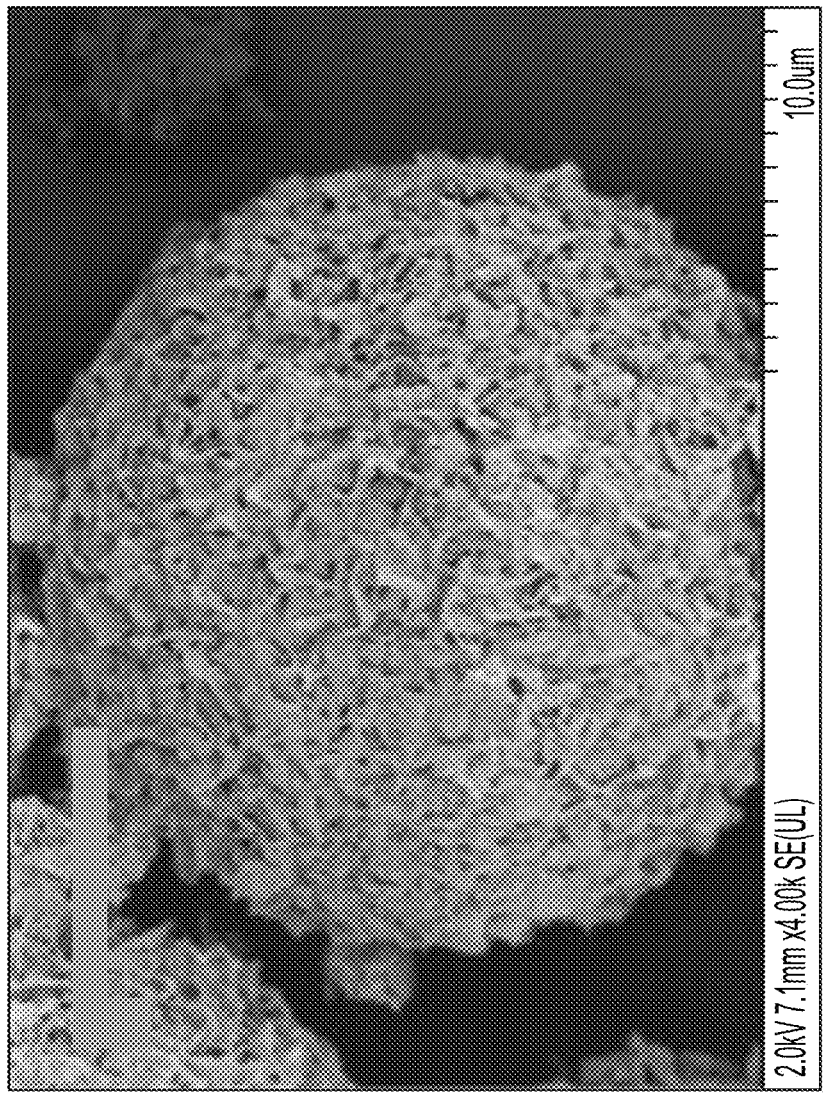

FIG. 4 is an optical microscopy image of the obtained polyimide microparticles. FIGS. 5A-5C are scanning electron microscopy (SEM) images of the obtained polyimide microparticles. The images illustrate similarly sized polyimide microparticles. FIGS. 5B and 5C illustrate the unique morphology of the polyimide microparticles. The surface has a porous, irregular scaffold of thinner polymer structures (e.g., ribbons or flakes). As will be illustrated in further example, this structure is consistent throughout the polyimide microparticles.

The sample appears to have many particles which have a diameter of about 10 microns to about 50 microns. These polyimide microparticles appear to have a suitable diameter range for SLS additive manufacturing methods Example 3—Polycondensation step: The procedure described in the polycondensation step of Example 1 was performed with 1,12-diaminododecane (22.780 g), 1-methyl-2-pyrrolidinone (250 g), and pyromellitic dianhydride in (24.799 g) in a IL round bottom flask using the same grade materials.

Example 4—Emulsion sol-gel imidization step: The procedure described in emulsion sol-gel imidization step of Example 2 was performed with DMF solution of PAA (4.66 g total, 20% PAA in DMF), decalin solution of PDMS (10 k cSt PDMS, 23.3 g total, 20% PDMS in decalin) and polystyrene-co-acrylate-based organic additive (0.1 g) in a 250 ml round glass cylindrical reactor using the same grade materials.

Figure 6:
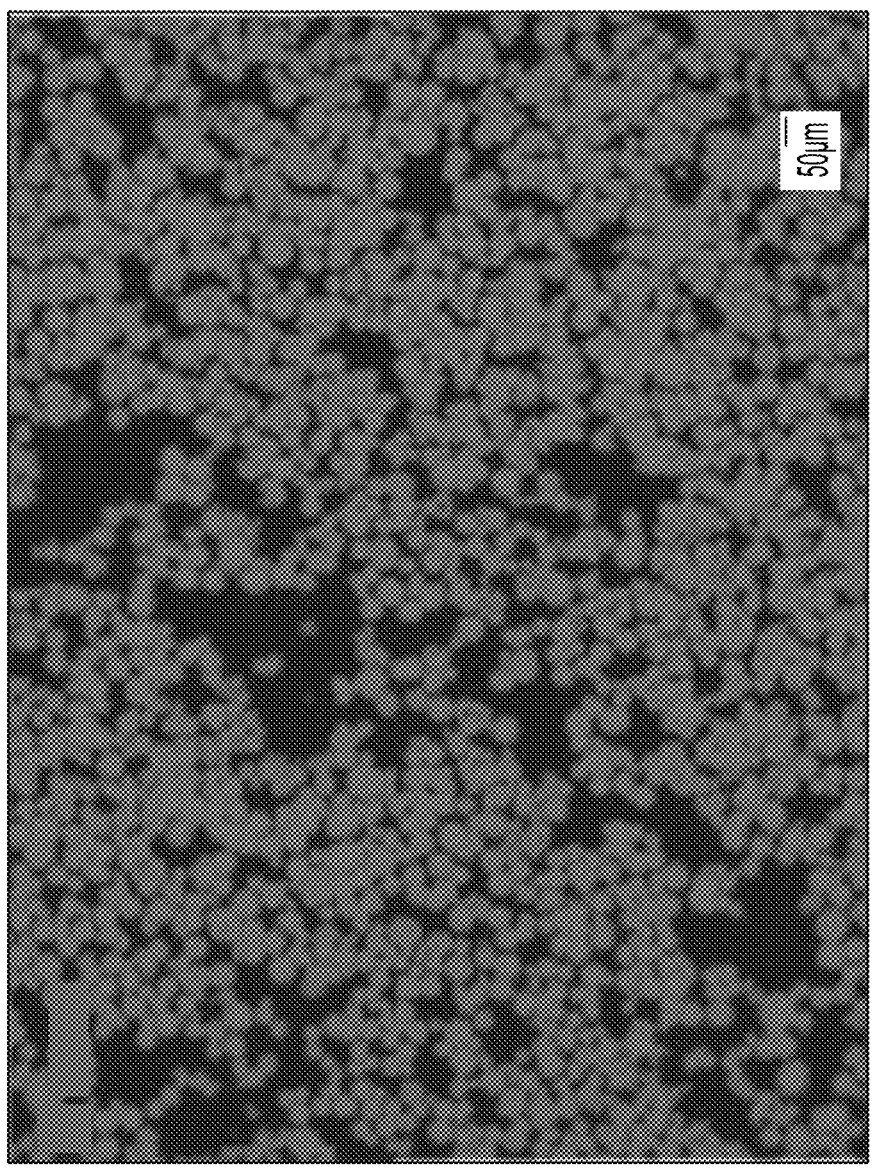
FIG. 6 is an optical microscopy image of polyimide microparticles of the present disclosure.
Figure 7A:
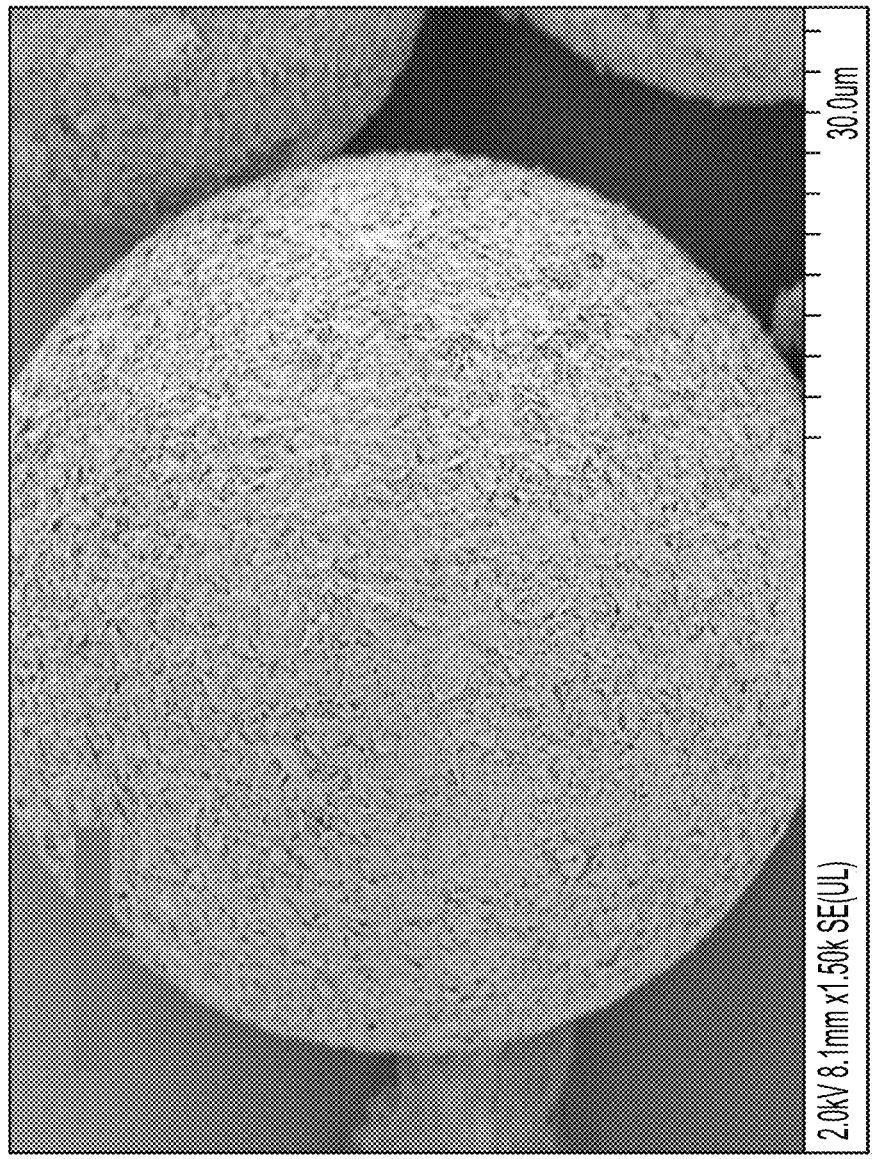
FIGS. 7A-7B are SEM images of polyimide microparticles of the present disclosure.
Figure 7B:
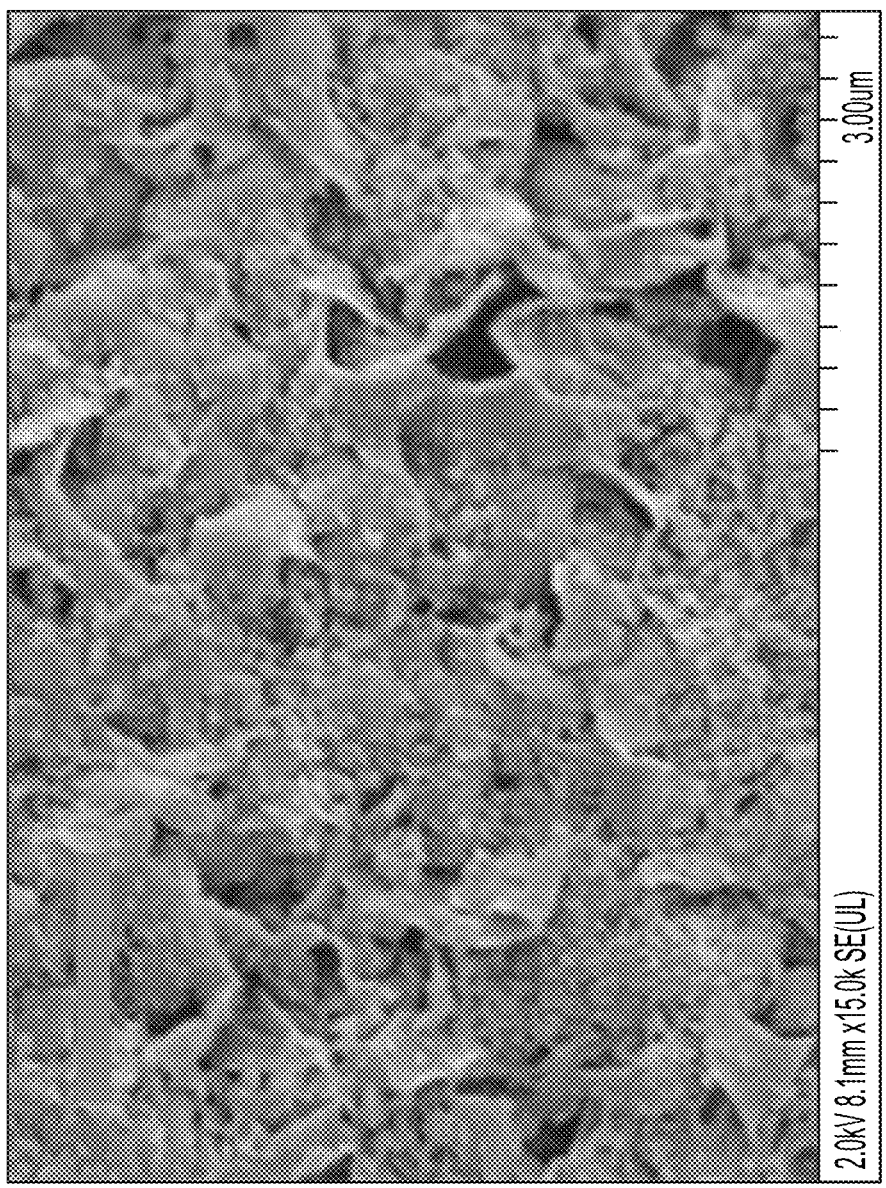

FIG. 6 is an optical microscopy image of the obtained polyimide microparticles. FIGS. 7A-7B are SEM images of the obtained polyimide microparticles. The images illustrate similarly sized polyimide microparticles. FIG. 7B illustrates the unique morphology of the polyimide microparticles as well as the polystyrene-co-acrylate-based organic additive covering a portion of the surface of the polyimide microparticles. The surface has a porous, irregular scaffold of thinner polymer structures (e.g., ribbons or flakes). As will be illustrated in further example, this structure is consistent throughout the polyimide microparticles.

Figure 8:
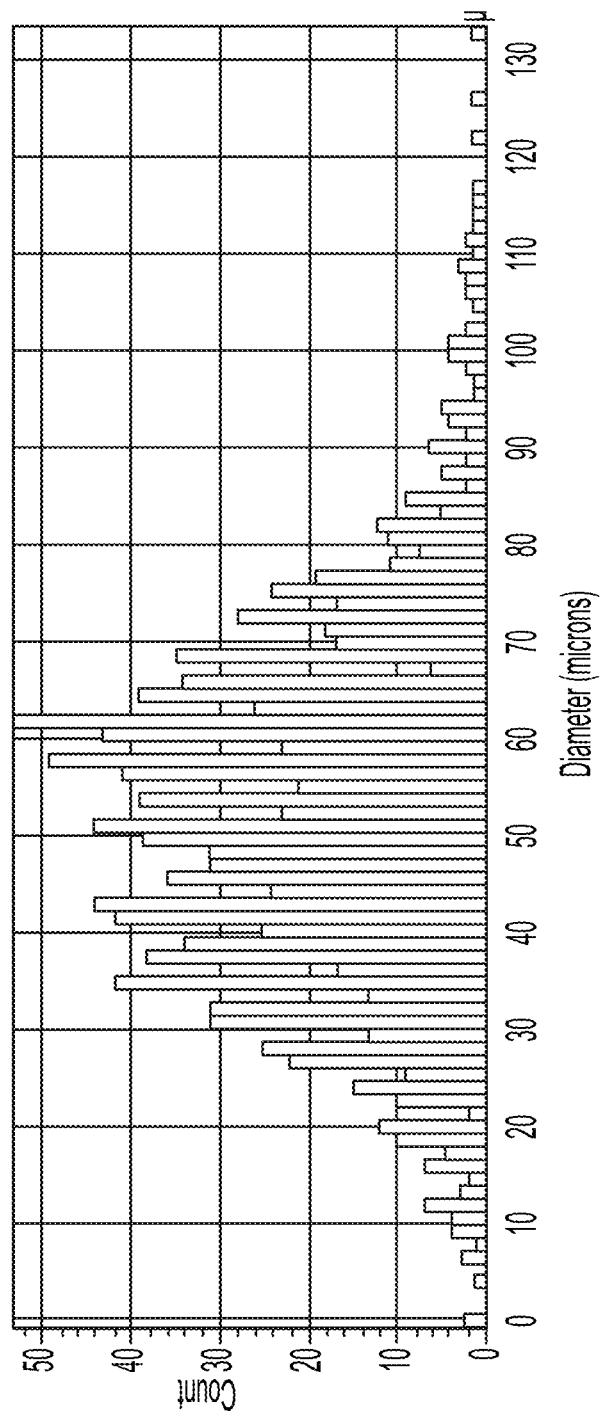
FIG. 8 is a histogram obtained from light scattering of polyimide microparticles of the present disclosure.

FIG. 8 is a histogram obtained from light scattering of the obtained polyimide microparticles in this example. The histogram illustrates that many particles have a diameter of about 20 microns to about 80 microns. These polyimide microparticles appear to have a suitable diameter range for SLS additive manufacturing methods. Particle sieving may be useful in reducing the population of higher diameter particles and/or narrowing the diameter span, thereby further increasing the suitability of the polyimide microparticles for SLS additive manufacturing methods.

Example 5—A three neck 250 mL round bottom flask equipped with magnetic stirrer and nitrogen inlet/outlet was charged with 1,12-diaminododecane (8.50 g, 98%, Sigma Aldrich) followed by 165 mL of dry DMF via cannula transfer. The 1,12-diaminododecane was allowed to dissolve in the DMF while heating to about 40° C. to about 45° C. under a nitrogen blanket. The mixture was stirred at 300 rpm while the pyromellitic dianhydride (9.32 g, 97%, Sigma Aldrich, PMDA) was added slowly to the flask over 30 minutes in 4 equal aliquots. After the complete addition of PMDA, the reaction was refluxed for 1.5 hours at 155° C., then overnight at ambient temperatures, then another 3 hours at 162° C. the next day. The mixture was then cooled to 100° C. and a few drops of formic acid were added to the solution to dissolve any unreacted PMDA. The reaction was then left stirring for another 2 hours. The resulting solution was cooled and the white solid was filtered and washed thoroughly with formic acid and acetone. The white powder was then decanted from the formic/acetone mixture and reslurried in acetone at ambient temperature for 2 hours. The final white powdered product was filtered and washed again with acetone and ether. The resulting wet cake was dried under vacuum at 80° C. for two days to give a white powder of polyimide in quantitative yields.

The crystallinity of the obtained polyimide microparticles was measured using DSC. The ΔH for the sample was 47.6 J/g. Using a reference for 100% crystallinity of a polyimide R-BAPB based on 1,3-bis(3,3'-4,4'-dicarboxyphenoxy)benzene (dianhydride R) and 4,4'-bis(4 aminophenoxy) biphenyl (diamine BAPB), where ΔH=98 J/g, the crystallinity of the obtained polyimide microparticles was about 49%. This illustrates that the polyimide microparticles produced by the methods described herein comprise semi-crystalline polyimide.

Example 6—A three neck 100 mL round bottom flask equipped with magnetic stirrer and nitrogen inlet/outlet was charged with 1,8-diaminooctane (1.07 g, 98%, Sigma Aldrich) followed by 25 mL dry DMF via cannula transfer. The 1,8-diaminooctane was allowed to dissolve in the DMF at ambient temperature under a nitrogen blanket. The mixture was stirred at 300 rpm while the pyromellitic dianhydride (1.62 g, 97%, Sigma Aldrich, PMDA) was added slowly to the flask over 30 minutes in 4 equal aliquots. After the complete addition of PMDA, the reaction was stirred for 30 minutes at ambient temperature, then heated to 165° C. and held there for 3 hours. The resulting colloidal solution was cooled and the white solid was filtered and washed thoroughly 3 times with acetone using centrifugation for separation and collection. The resulting wet cake was dried under vacuum at 80° C. for two days to give a white powder of polyimide in quantitative yields.

The crystallinity of the obtained polyimide microparticles was measured using DSC. The ΔH for the sample was 47.6 J/g. Using a reference described in Example 5, the crystallinity of the obtained polyimide microparticles was about 54%. This illustrates that the polyimide microparticles produced by the methods described herein comprise semi-crystalline polyimide.

Example 7—Polycondensation step: The procedure described in the polycondensation step of Example 1 was performed with 1,12-diaminododecane (22.780 g), 1-methyl-2-pyrrolidinone (250 g), and pyromellitic dianhydride in (24.799 g) in a 1L round bottom flask using the same grade materials.

Emulsion sol-gel imidization step (The procedure described in emulsion sol-gel imidization step of Example 2 was performed with DMF solution of PAA (20.66 g used from polycondensation step above, 20% PAA in DMF), decalin solution of PDMS (10 k cSt PDMS, 116.6 g total, 20% PDMS in decalin) and polystyrene-co-acrylate-based organic additive (0.2 g) in a 250 mL round glass cylindrical reactor using the same grade materials.

The mixture was stirred at room temperature and 620 rpm for 15 min, heated to 140° C. over 30 min then maintained at 140° C. for 3 hours. The obtained polyimide microparticles were filtered using Buchner funnel, washed with heptane four times, and dried overnight at 80° C. The angle of repose of this material was 37.9 degrees, indicating good flow.

Figure 9A:
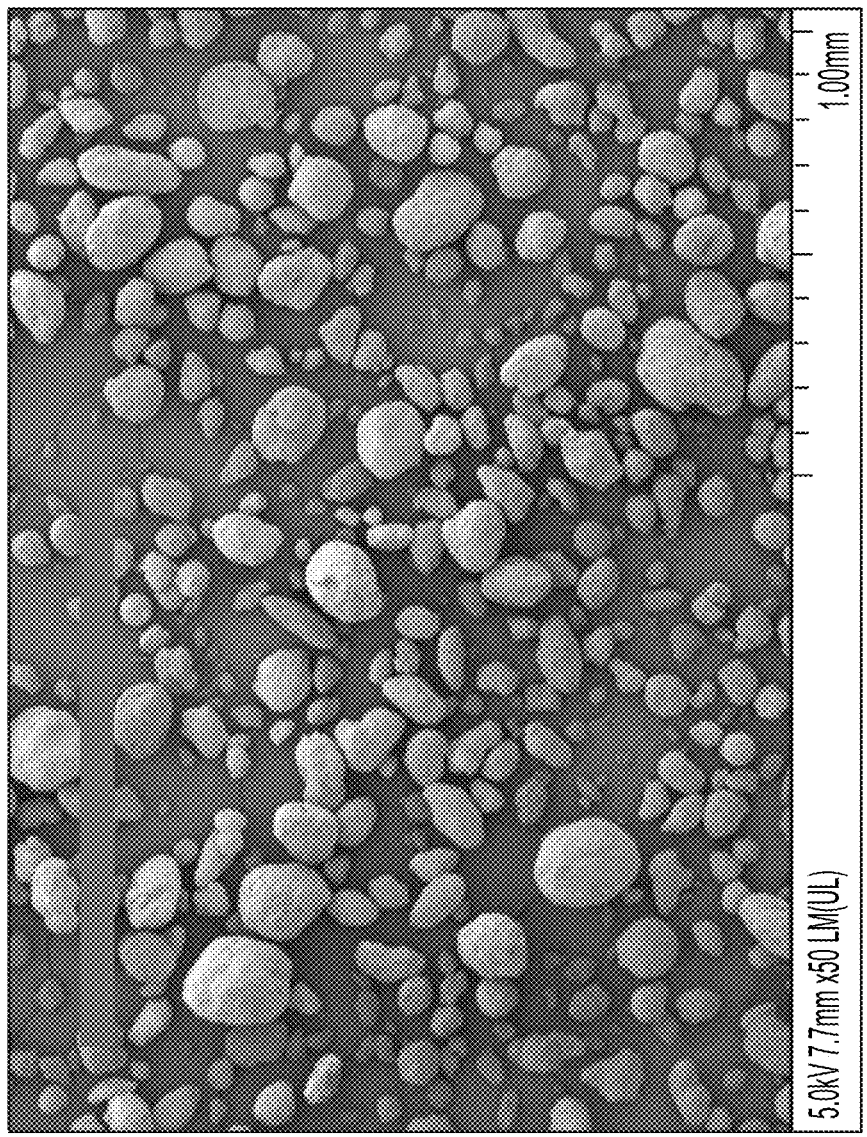
FIGS. 9A-9C are SEM images of polyimide microparticles of the present disclosure.
Figure 9B:
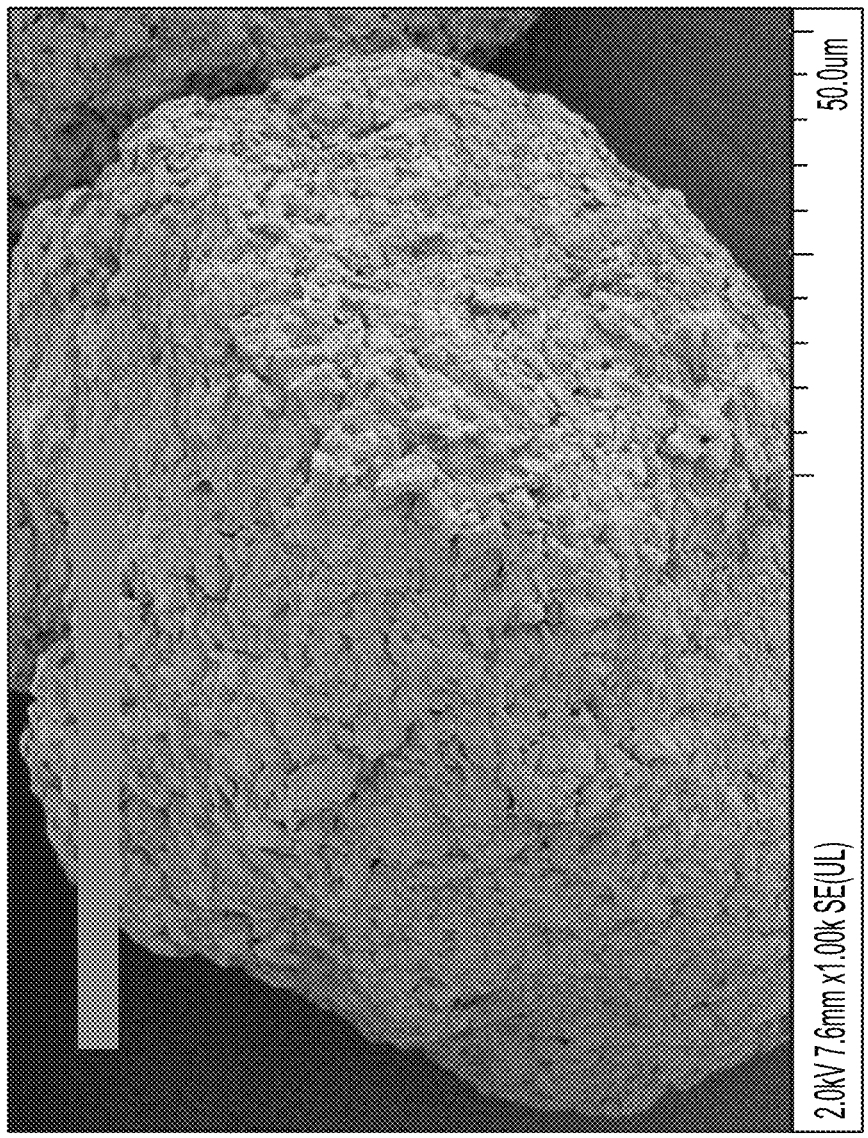
Figure 9C:
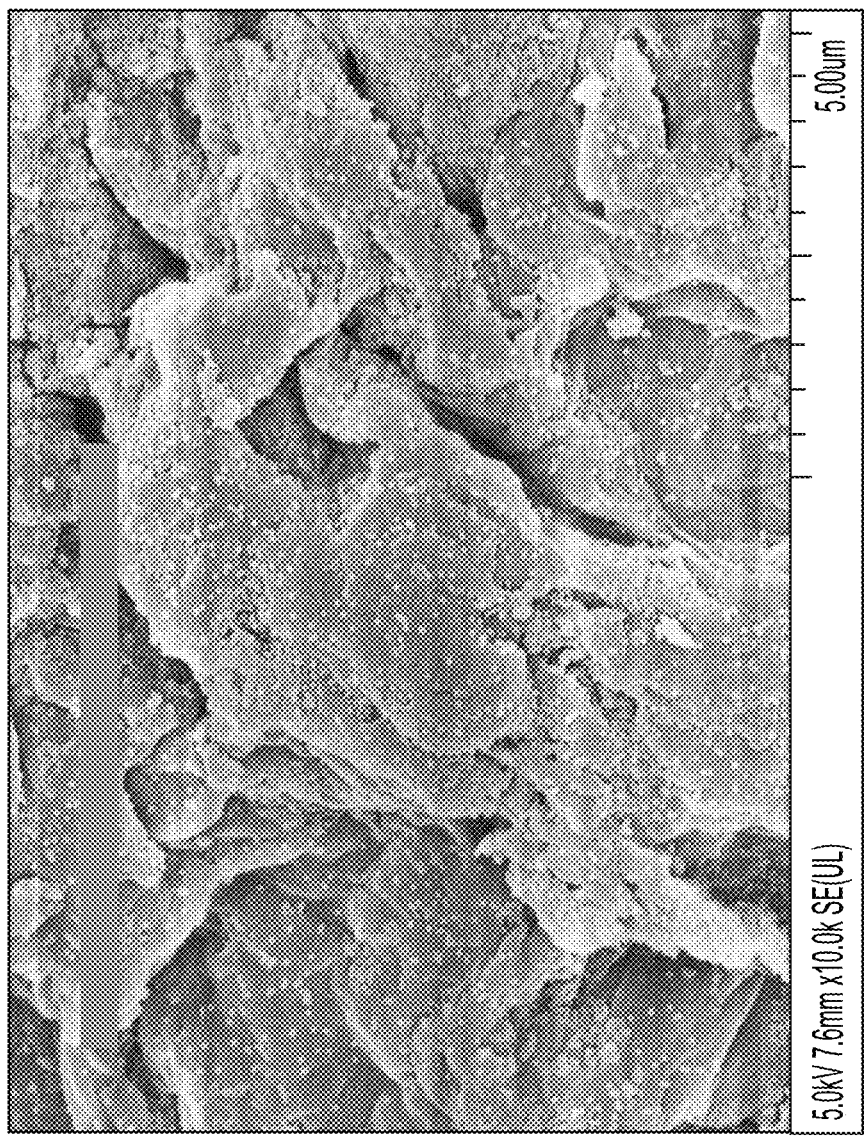

FIGS. 9A-9C are SEM images of the obtained polyimide microparticles. The images illustrate that these polyimide microparticles have a wider diameter span and less circularity. However, as illustrated in FIGS. 9B-9C, the surface morphology, while less ribbon-like, is a porous, irregular scaffold and resembles more a polymer melt that has solidified into a porous structure. FIG. 9C also illustrates that the polystyrene-co-acrylate-based organic additive is on the surface of the polyimide microparticles.

Figure 10A:
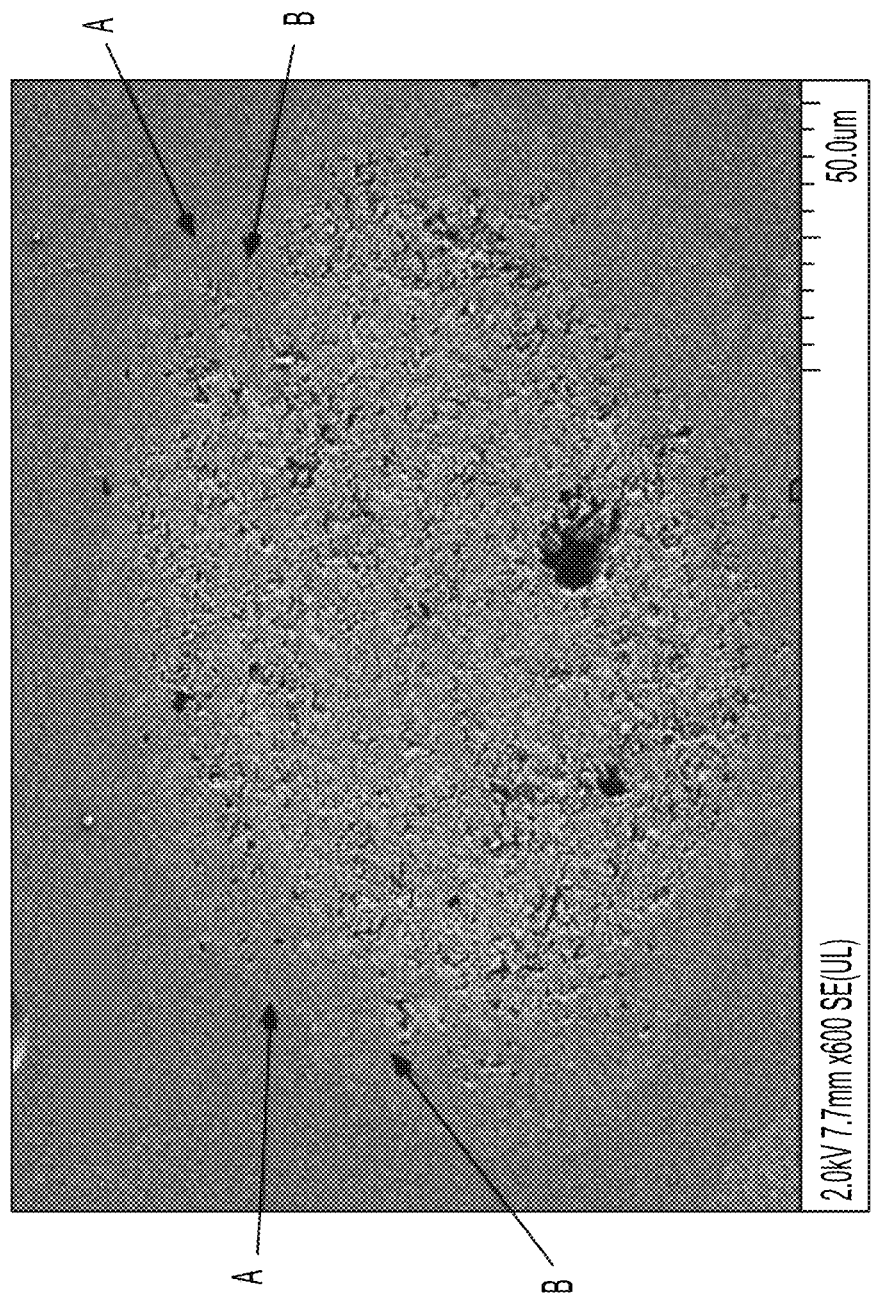
FIGS. 10A-10C are cross-sectional SEM images of polyimide microparticles of the present disclosure.
Figure 10B:
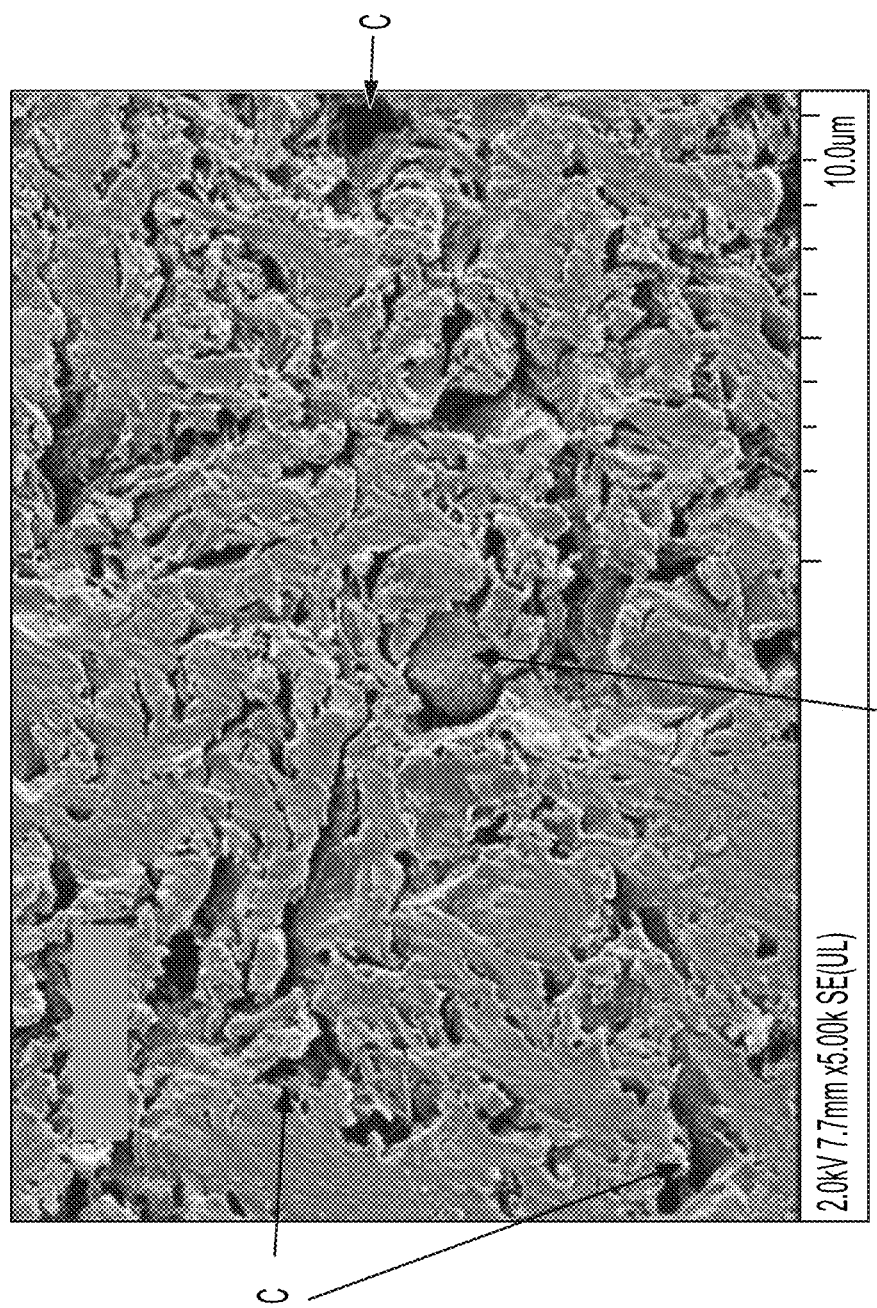
Figure 10C:
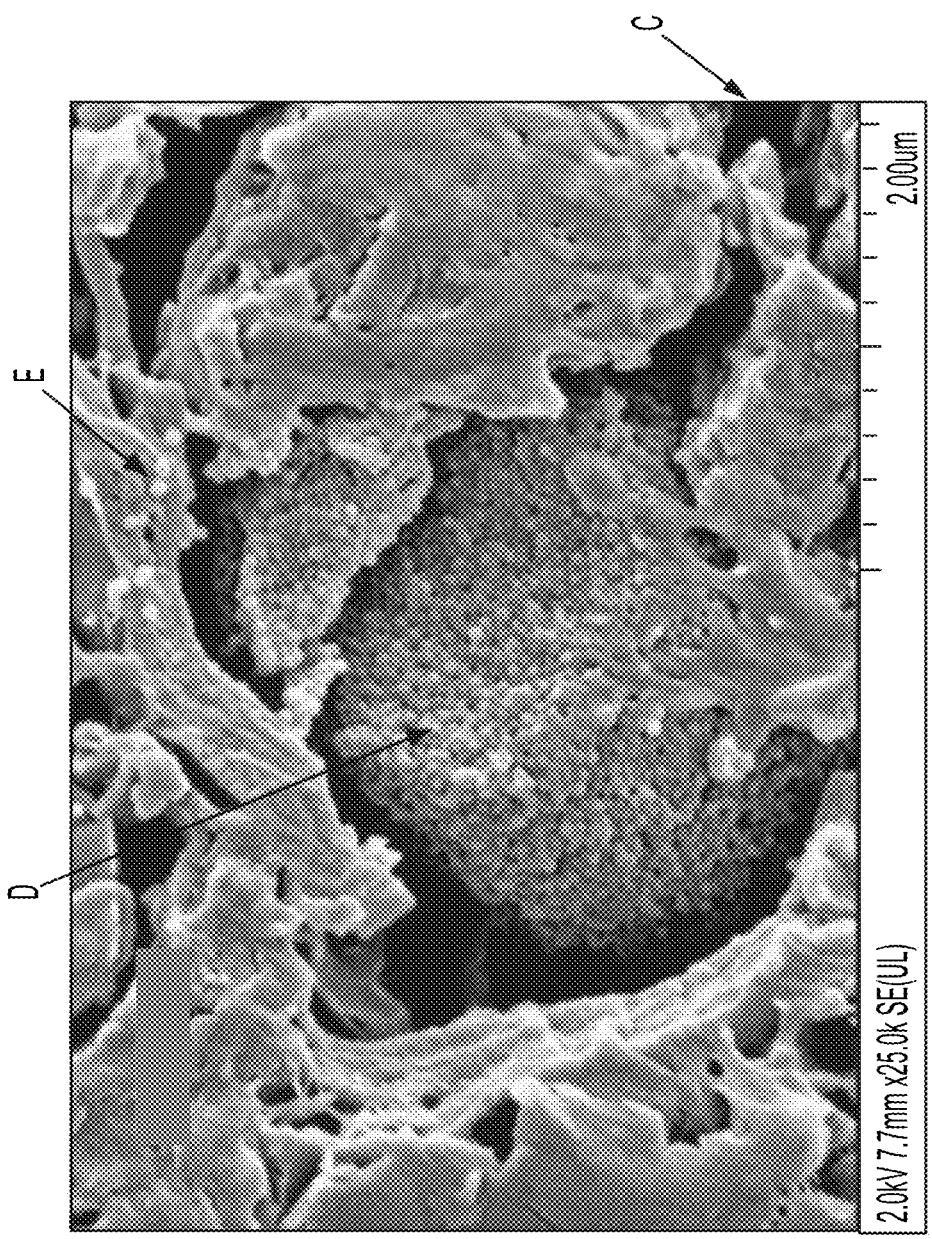

FIGS. 10A-10C are cross-sectional SEM images of the obtained polyimide microparticles. The polyimide microparticles were fixed in epoxy, microtomed, and imaged. FIG. 10A shows a single polyimide microparticle where the epoxy has partially penetrated into the polyimide microparticle. The perimeter of the polyimide microparticle is where the darker grey transitions to lighter grey indicated by arrows A. The portion of the polyimide microparticle where the epoxy has penetrated is indicated by arrows B. This illustrates that the polyimide microparticle of the present disclosure is porous. FIGS. 10B-10C are higher magnification SEM images of FIG. 10A. These better illustrate that the porous, irregular scaffold morphology is throughout the polyimide microparticle where arrows C indicate pores. Further illustrated is a polystyrene-co-acrylate-based organic additive agglomerate indicated by arrows D that was trapped inside the polyimide microparticle during the synthesis process. Further, arrow E indicates individual polystyrene-co-acrylate-based organic additives that are on the surface of the porous, irregular scaffold interior of the polyimide microparticle.

After sieving the obtained polyimide microparticles through a 300 micron sieve, the angle of repose was measured at 23° C. and 47% relative humidity to be 38° (average of three measurements), which is flow suitable for use in SLS additive manufacturing methods. We note that the visual comparison of Example 7 to other previous examples shows that Example 7 appears to have less circularity and larger diameter span. Therefore, it is expected that the previous examples would have a lower angle of repose and, therefore, be even more suitable for use in SLS additive manufacturing methods.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art and having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meanings unless otherwise explicitly and clearly defined by the patentee. Moreover, the indefinite articles "a" or "an," as used in the claims, are defined herein to mean one or more than one of the elements that it introduces.

The invention claimed is:

1. A composition comprising:
   microparticles comprising a polyimide and an emulsion stabilizer forming a coating upon an outer surface of the microparticles;
   wherein the emulsion stabilizer comprises oxide nanoparticles.

2. The composition of claim 1, wherein the polyimide comprises a reaction product of a diamine and a dianhydride.

3. The composition of claim 1, wherein the oxide nanoparticles comprise silica nanoparticles.

4. The composition of claim 1, wherein the microparticles have a circularity of about 0.9 to about 1.0.

5. The composition of claim 1, wherein the microparticles have an angle of repose of about 25° to about 45°.

6. The composition of claim 1, wherein the microparticles have a sintering window of about 15° C. to about 35° C.

7. The composition of claim 1, wherein the microparticles have a D10 of about 0.5 µm to about 50 µm, a D50 of about 10 µm to about 200 µm, and a D90 of about 50 µm to about 300 µm, wherein D10<D50<D90.

8. The composition of claim 1, wherein the microparticles have a diameter span of about 0.2 to about 10.

9. The composition of claim 1, wherein the microparticles have a Hausner ratio of about 1.0 to about 1.5.

10. The composition of claim 1, wherein the microparticles have a bulk density of about 0.2 g/cm$^3$ to about 0.8 g/cm$^3$, a BET surface area of about 30 m$^2$/g to about 500 m$^2$/g, or any combination thereof.

11. The composition of claim 1, wherein the microparticles have a porous morphology.

12. A method comprising:
    depositing the composition of claim 1 upon a surface; and
    once deposited, heating at least a portion of the microparticles to promote consolidation thereof and form a consolidated body.

13. The method of claim 12, wherein thermoplastic polymer particles are deposited upon the surface in combination with the microparticles comprising the polyimide.

14. The method of claim 12, wherein heating takes place by selective laser sintering.

* * * * *